(12) United States Patent
Marcu et al.

(10) Patent No.: US 7,609,413 B1
(45) Date of Patent: Oct. 27, 2009

(54) COLOR MANAGEMENT FOR LIMITED GAMUT DEVICES

(75) Inventors: Gabriel Marcu, San Jose, CA (US); Steve Swen, Cupertino, CA (US); Luke Stanislaw Wallis, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1435 days.

(21) Appl. No.: 10/138,363

(22) Filed: May 2, 2002

(51) Int. Cl.
*G06F 15/00* (2006.01)
*G03F 3/08* (2006.01)
*G06K 9/00* (2006.01)
*G09G 5/02* (2006.01)

(52) U.S. Cl. .................. 358/1.9; 358/520; 358/523; 358/524; 382/162; 382/163; 382/166; 382/167; 345/589; 345/590; 345/591

(58) Field of Classification Search .................. 358/1.9, 358/520, 523, 524, 518, 519, 1.15, 400, 1.14; 382/163, 162, 167, 166; 345/589, 590, 591
See application file for complete search history.

(56) References Cited

U.S. PATENT DOCUMENTS

| | | | |
|---|---|---|---|
| 5,510,910 | A | 4/1996 | Bockman et al. |
| 5,611,030 | A | 3/1997 | Stokes |
| 5,978,011 | A | 11/1999 | Jacob et al. |
| 6,198,843 | B1 | 3/2001 | Nakauchi et al. |
| 6,225,974 | B1 | 5/2001 | Marsden et al. |
| 6,282,311 | B1 | 8/2001 | McCarthy et al. |
| 6,282,312 | B1 | 8/2001 | McCarthy et al. |
| 6,282,313 | B1 | 8/2001 | McCarthy et al. |
| 6,285,784 | B1 | 9/2001 | Spaulding et al. |
| 6,310,696 | B1 | 10/2001 | Kumada |
| 6,331,899 | B1 | 12/2001 | Samadani |
| 6,335,983 | B1 | 1/2002 | McCarthy et al. |
| 6,373,595 | B1 * | 4/2002 | Semba et al. ............... 358/1.9 |

OTHER PUBLICATIONS

Gregory Ward Larson: "Overcoming Gamut and Dynamic Range Limitations in Digital Images", *Proceedings of the Sixth Color Imaging Conference*, Nov. 1998.
C. A. Poynton: "Wide Gamut Device-independent Colour Image Interchange", *Proceedings of the International Broadcasting Convention*, Sep. 16-20, 1994, Conf. Publ. No. 397, 1994.
Gunter Wyszechi; W.S. Stiles: *Color Science, Concepts and Methods, Quantitative Data and Formulae*, pp. 670-672, 1982.
R.S. Gentile; E. Walowit; J.P. Allebach: "A Comparison of Techniques for Color Gamut Mismatch Compensation", *J. Imaging Technology*, vol. 16, No. 5, pp. 176-181, 1990.

* cited by examiner

*Primary Examiner*—Edward L Coles
*Assistant Examiner*—Charlotte M Baker
(74) *Attorney, Agent, or Firm*—Blakely, Sokoloff, Taylor & Zafman LLP

(57) ABSTRACT

Methods and apparatuses for performing color manipulation using virtual gamuts. In one aspect of the invention, a method to perform color manipulation on a digital processing system includes: performing color manipulation using a virtual gamut of a device if a real gamut of the device is poor in quality. When the real gamut of the device is wide, color manipulations are performed using the real gamut of the device. In one example according to this aspect, whether or not the real gamut of the device is poor in quality is determined by comparing an area of the real gamut with a threshold gamut area in a chromaticity diagram. A virtual profile of the device specifies the virtual gamut of the device.

66 Claims, 22 Drawing Sheets

COLOR MANAGEMENT FOR LIMITED GAMUT DEVICES

FIELD OF THE INVENTION

The invention relates to color management, and more particularly to device profiles for specifying gamut of devices.

BACKGROUND OF THE INVENTION

Many display devices have limited color gamuts. Up until now, display manufacturers continuously attempted to increase the native gamut of the displays. However, there is an inherent conflict between the reduction of the power consumption and the increase of the color gamut and luminance of a display device, particularly in the case of portable displays. Increasing the color gamut requires the use of more chromatic filters (thicker filters), which in turn reduces the luminance of the display. In order to compensate for the reduction in luminance, a more powerful backlight is required, most often resulting in an increase in battery power consumption, which reduces the duration of operation of the battery and limits the overall performance of the product. Therefore, in those cases, the limited color gamut is the result of lowering the power consumption. In other cases, the display devices using certain technologies cannot have a large gamut.

Due to mismatch in color gamut, a display device may be able to display a color that cannot be reproduced by a printer; and the printer may be able to reproduce a color that cannot be displayed on the display device. Similarly, when an image produced from a scanner is displayed on a display device or printed on a printer, color losses may occur. To avoid such problems, a color management scheme can be used to match colors that can be represented on one device (e.g., a scanner or a display) to the colors on another device (e.g., a printer).

One of the problems associated with the small gamut display is that the color matching in a typical color management workflow produces poor results when a match is performed between the small gamut display and a destination device, which typically has a large gamut. For example, the quality of an image is reduced when a gamut compression is performed to match the gamut of a source device (e.g., a scanner) to the small gamut of the display in order to display the image on the small gamut display and when a gamut stretching is performed to match the small gamut of the display to a larger gamut of a destination device (e.g., a printer) in order to process the image on the destination device. Sometimes the colors of an image are designed on the screen, within the limited color gamut, before the colors are mapped into the larger gamut of a destination device for further processing (e.g., for printing). Even if the mapping is from one display device to another display device, stretching the smaller gamut into a larger gamut may impose serious problems.

Thus, in a color management workflow, color matching between a limited gamut device and an arbitrary device with a larger gamut will result in color losses due to mapping from a small gamut to a larger gamut. With various degrees, this situation exists on various computer systems, especially on portable computer systems using TFT LCD displays, which typically have a limited color gamut.

The current method of color characterization of a display device uses the chromaticity data of the primaries of the device. For example, Cathode Ray Tube (CRT) monitors have red, green and blue phosphors. The colors produced by the phosphors determine the colors of red, green and blue, the primaries of the CRT monitor. The positions of the primaries on a CIE (Commission International d'Eclairage) 1931 chromaticity diagram determine the color characteristics of the display device.

Typically, color matching operations through gamut processing (e.g., compressing, stretching, clipping and morphing) are performed to match the colors on a source device and a destination device. However, such color matching operations typically produce poor results when the difference in gamut is large and when the source gamut is small. For example, when printing an image displayed on a small gamut screen (e.g., a screen of a portable computer) using a printer with a large color gamut (e.g., a ink jet printer using photo quality papers), the colors can be attenuated and desaturated (washed out).

SUMMARY OF THE INVENTION

Methods and apparatuses for performing color manipulation using virtual gamuts are described here.

In one aspect of the invention, a method to perform color manipulation on a digital processing system includes: performing color manipulation using a virtual gamut of a device if a real gamut of the device is poor in quality, such as, for example, a small gamut size or otherwise restricted. When the real gamut of the device is wide, color manipulations are performed using the real gamut of the device. In one example according to this aspect, whether or not the real gamut of the device is poor in quality is determined by comparing the area of the real gamut with the area of a threshold gamut in a chromaticity diagram. A virtual profile of the device specifies the virtual gamut of the device. Color manipulations include operations for color management, which include at least one of: a) converting a color representation in a device dependent color space to a corresponding color representation in a device independent color space; and b) converting a color representation in a device independent color space to a corresponding color representation in another device's dependent color space.

In another example, the virtual gamut of the device is defined from an interpolation using the real gamut, a threshold gamut and a limit gamut in a chromaticity diagram; and a profile of the device is generated to specify the virtual gamut. The area of the virtual gamut is determined from the area of the real gamut, the area of the threshold gamut and the area of the limit gamut in the chromaticity diagram; a primary of the virtual gamut and a corresponding primary of the real gamut are on a hue locus; and a saturation of the primary of the virtual gamut is larger than a saturation of the corresponding primary of the real gamut. The area of the virtual gamut increases as the area of the real gamut increases; and the area of the virtual gamut is larger than the area of the real gamut, larger than the area of the limit gamut, and smaller than the area of the threshold gamut. In one example, the threshold gamut is the same as the limit gamut such that a device with a gamut smaller than the threshold gamut has the threshold gamut as its virtual gamut. In one example, the threshold gamut and the limit gamut are determined from real gamuts of destination devices in the chromaticity diagram. In one example, the threshold gamut and the limit gamut are predefined gamuts, which are independent on the real gamut.

The present invention includes methods for generating virtual gamuts for performing color manipulation on a digital processing system and machine readable media which contain data specifying such virtual gamuts.

The present invention includes apparatuses which perform these methods, including data processing systems which perform these methods and computer readable media which when executed on data processing systems cause the systems to perform these methods.

Other features of the present invention will be apparent from the accompanying drawings and from the detailed description which follow.

BRIEF DESCRIPTION OF THE DRAWINGS

The present invention is illustrated by way of example and not limitation in the figures of the accompanying drawings in which like references indicate similar elements.

DETAILED DESCRIPTION

The following description and drawings are illustrative of the invention and are not to be construed as limiting the invention. Numerous specific details are described to provide a thorough understanding of the present invention. However, in certain instances, well known or conventional details are not described in order to avoid obscuring the description of the present invention.

Figure 1:
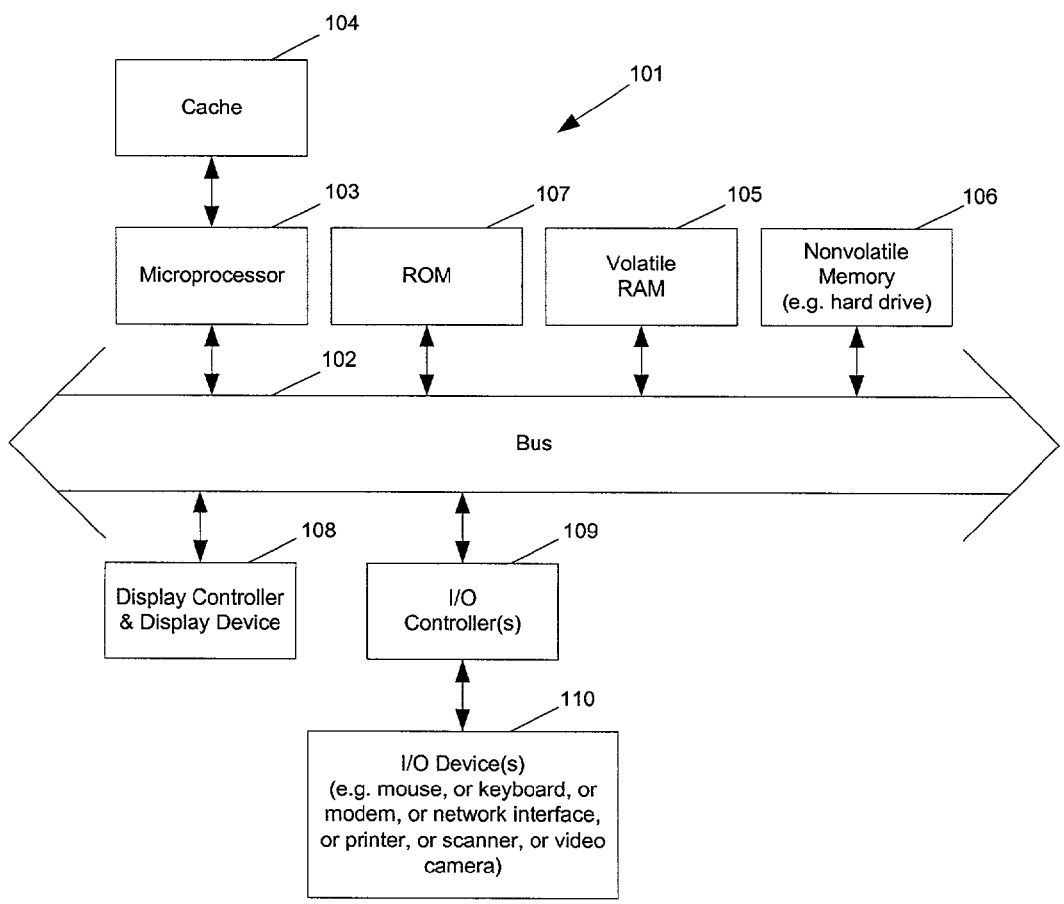
FIG. 1 shows a block diagram example of a data processing system which may be used with the present invention.

FIG. 1 shows one example of a typical computer system which may be used with the present invention. Note that while FIG. 1 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention. The computer system of FIG. 1 may, for example, be an Apple Macintosh computer.

As shown in FIG. 1, the computer system 101, which is a form of a data processing system, includes a bus 102 which is coupled to a microprocessor 103 and a ROM 107 and volatile RAM 105 and a non-volatile memory 106. The microprocessor 103, which may be a G3 or G4 microprocessor from Motorola, Inc. or IBM is coupled to cache memory 104 as shown in the example of FIG. 1. The bus 102 interconnects these various components together and also interconnects these components 103, 107, 105, and 106 to a display controller and display device 108 and to peripheral devices such as input/output (I/O) devices which may be mice, keyboards, modems, network interfaces, printers, scanners, video cameras and other devices which are well known in the art. Typically, the input/output devices 110 are coupled to the system through input/output controllers 109. The volatile RAM 105 is typically implemented as dynamic RAM (DRAM) which requires power continually in order to refresh or maintain the data in the memory. The non-volatile memory 106 is typically a magnetic hard drive or a magnetic optical drive or an optical drive or a DVD RAM or other type of memory systems which maintain data even after power is removed from the system. Typically, the non-volatile memory will also be a random access memory although this is not required. While FIG. 1 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 102 may include one or more buses connected to each other through various bridges, controllers and/or adapters as is well known in the art. In one embodiment the I/O controller 109 includes a USB (Universal Serial Bus) adapter for controlling USB peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 107, volatile RAM 105, non-volatile memory 106, cache 104 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 103.

To solve the problem of gamut mismatching caused by a small source gamut, at least one embodiment of the present invention replaces the source gamut with a new gamut, referred to as a virtual gamut, which is larger than a value considered acceptable for any color matching operation. Thus, matching from an excessively small gamut to a large gamut is avoided; and the quality of the resulting matched colors is improved.

At least one embodiment of the present invention seeks to avoid the limitation imposed by devices with small gamuts by creating a virtual gamut for a device with a color gamut smaller than a certain threshold and using the virtual gamut in the color management for this device. For large gamut devices, real gamuts are used in the color management; and the transition between the use of real gamuts and the use of virtual gamuts is smooth and undetected by the user.

Typically, a virtual gamut should be large enough such that a color matching operation using the virtual gamut produces pleasing color results. When the display has a good color gamut, the color matching should use the real gamut of the device. The transition from the use of a virtual gamut to the use of a real gamut should be smooth and undetectable to the user. It may also be desirable that the virtual gamut maintains the monotonic color performance of the devices in the color flow. That is, when two color matching results from two displays with different color gamuts are compared, the reproduction corresponding to the larger gamut display should have a better color quality than the reproduction corresponding to the smaller gamut display.

A limit gamut is chosen as the minimum acceptable color gamut for a device for all color management operations. A virtual gamut that is larger than the real gamut offers a color management result that is better than the result obtained when the real device gamut is used; and a virtual gamut that is larger than the limit gamut offers a color management result that is better than the minimum acceptable result.

Figure 2:
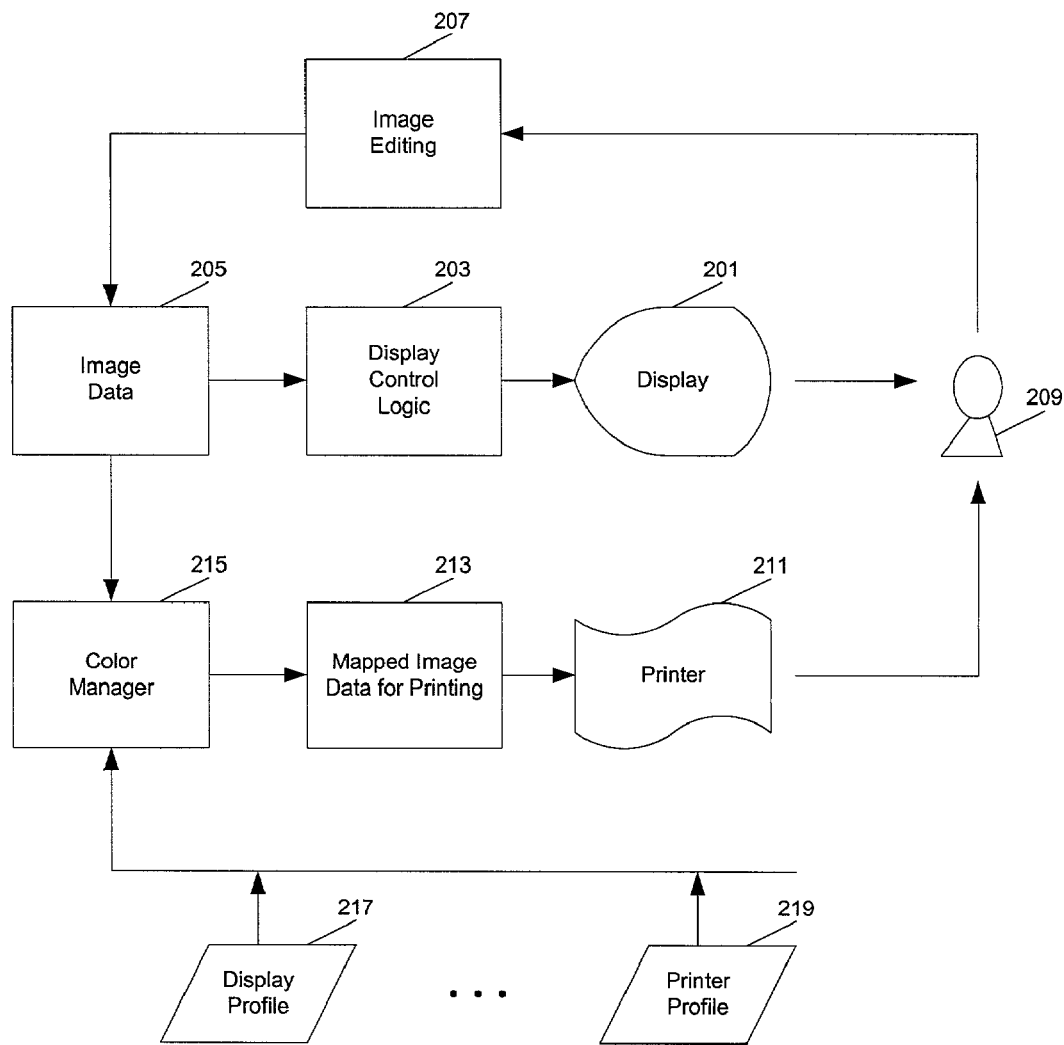
FIG. 2 illustrates a typical color management scheme.

FIG. 2 illustrates a typical color management scheme. Color manager 215 utilizes the color profiles (e.g., display profile 217, printer profile 219) for display 201 and printer 211 to match the colors on these devices. Typically, color sensing devices (e.g., video camera, scanner, and others) generate images with colors represented in device dependent color spaces (e.g., RGB, CMY, CMYK, HSB, HSV); and color producing devices (e.g., displays, printers, and others) reproduce images with colors represented in other device dependent color spaces. Once the color characterization of devices is available (e.g., in terms of the chromaticity data of the primaries of the devices), colors represented in a device dependent color space for a source device can be converted into colors represented in a device dependent color space for a destination device. To reduce the number of look up tables required for conversion, a typical color manager first converts colors from the device dependent color space for the source device to a common device independent color space (e.g., CIE XYZ, CIE xyY, L*a*b*, Luv) and then from the device independent color space to the device dependent color space for the destination device.

Sometimes colors in an image are generated with the help of a display device and imaging software. For example, user 209 views the image on display 201, controlled by display control logic 203 using image data 205. In some cases, display control logic 203 also performs gamma correction. Using image editing software 207, user 209 can modify image data 205. Thus, the interactive image editing system (201, 203, 205, 207, 209) is a color sensing device in one sense.

In order to reproduce the image on display 201 using printer 211, color manager 215 uses profiles 217 and 219 to convert image data 205 to mapped image data 213, which controls printer 211 to produce for user 209 an image that closely resembles the image on display 201.

Figure 3:
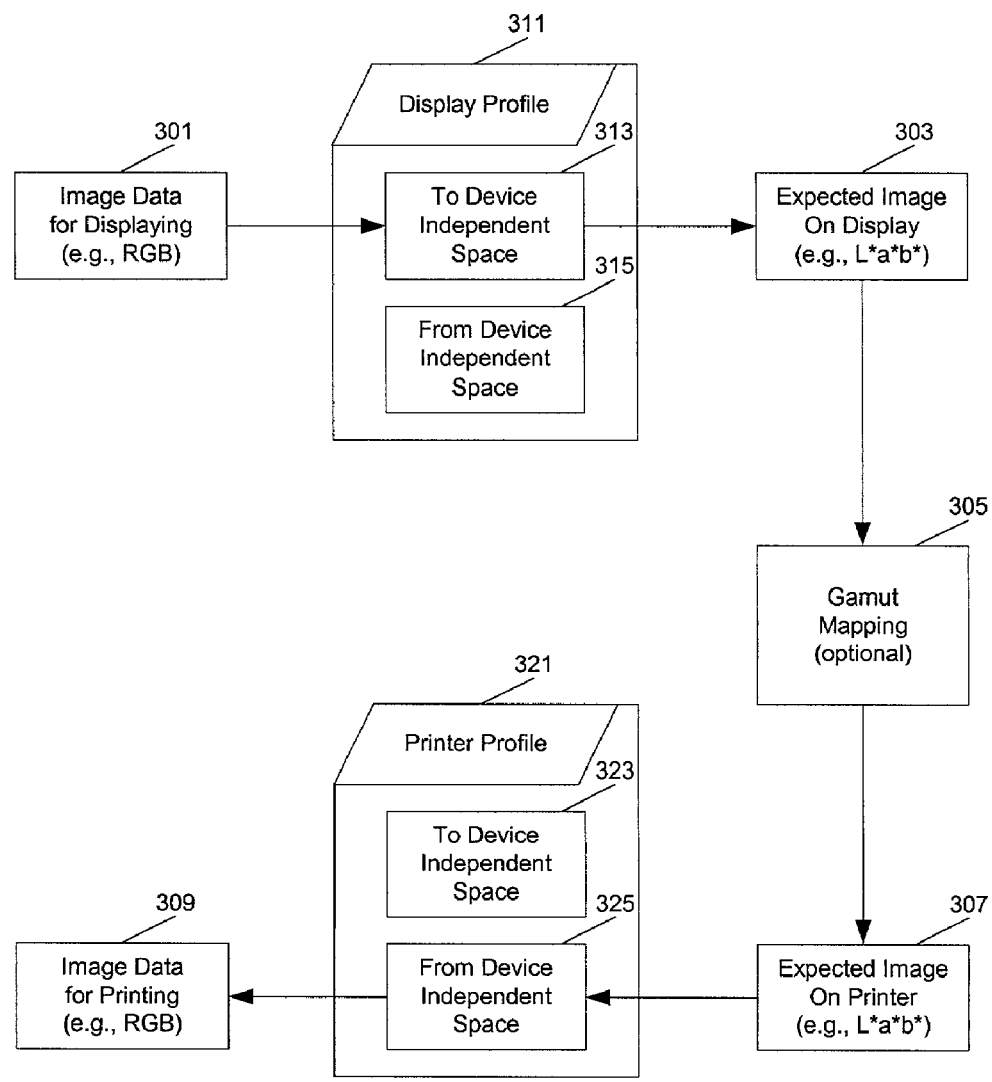
FIG. 3 illustrates an example flow diagram for a typical color matching scheme.

FIG. 3 illustrates an example flow diagram for a typical color matching scheme. Image data 301 for driving a display device is represented in a device dependent color space for the display device. To produce the matching colors on a printer, a color management system needs to generate image data 309 for driving the printer, which is represented in a device dependent color space for the printer.

Typically, display profile 311 contains look up table 313 for converting the colors represented in the device dependent color space for (e.g., RGB) the display device to the colors represented in a device independent color space (e.g., L*a*b*); it also contains look up table 315 for converting the colors represented in the device independent color space back to the colors represented in the device dependent color space for the display device. Similarly, printer profile 321 contains look up table 323 for converting colors represented in the device dependent color space for the printer to colors represented in the device independent color space (e.g., L*a*b*) and look up table 325 for converting colors represented in the device independent color space back to colors represented in the device independent color space for the printer.

Once the image data 301 is converted to image 303 represented in a device independent color space using display profile 311, it can be converted into image data 309 for printing in the device dependent color space using the printer profile 321. It is seen that when the display gamut is small, gamut compression or clipping must be performed to convert image data 301 in the device dependent color space to image data 303 in the device independent color space, which results in color losses.

Optionally, gamut mapping 305 can be performed through stretching, compressing, clipping the gamut of the display, or other techniques to map the gamut of the printer in order to match the colors on the display to the colors on the printer.

Figure 4:
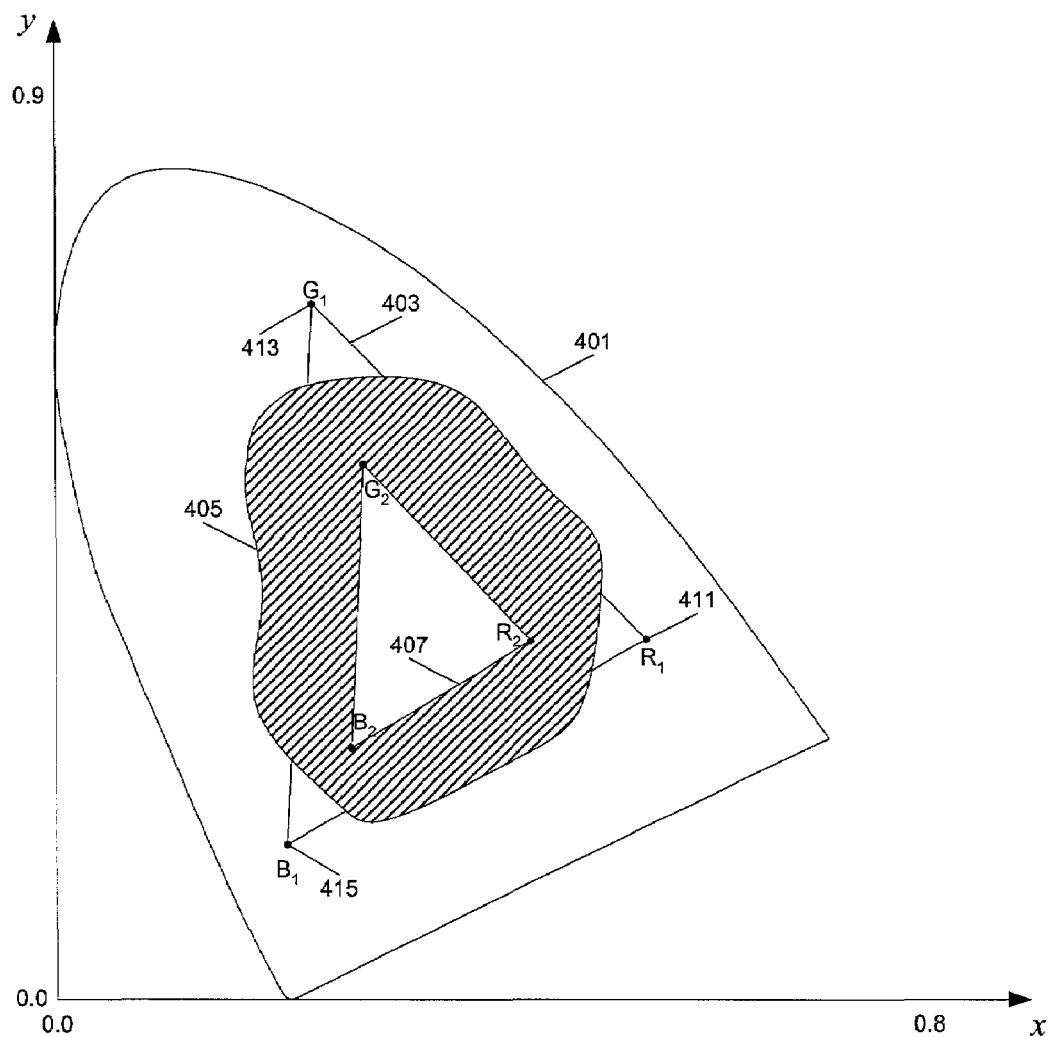
FIG. 4 illustrates a chromaticity diagram showing gamuts of various devices.

FIG. 4 illustrates a chromaticity diagram showing gamuts of various devices. The horseshoe-shaped color space 401 represents the colors visible to a standard observer. Gamut 405 represents a typical gamut for a printer. Gamut 403 represents a large gamut for a CRT type display device. Points 411, 413 and 415 represent the positions of the three primaries of the device, Red ($R_1$), Green ($G_1$) and Blue ($B_1$). The colors that can be produced by the device are within the triangle defined by points 411, 413 and 415 ($R_1G_1B_1$). Similarly, gamut 407 represents a small gamut for a small gamut device.

When an image of a large gamut (e.g., gamut 403) is displayed on a device with gamut 407, gamut compression or clipping occurs, which reduces the quality of the image. To match the colors in small gamut 407 to that in printer gamut 405, only a small number of colors of a printer can be utilized.

Although it is possible to perform a gamut stretching (or morphing) operation to map the image in gamut 407 to that in gamut 405, excessive stretching may also produce poor results.

Figure 5:
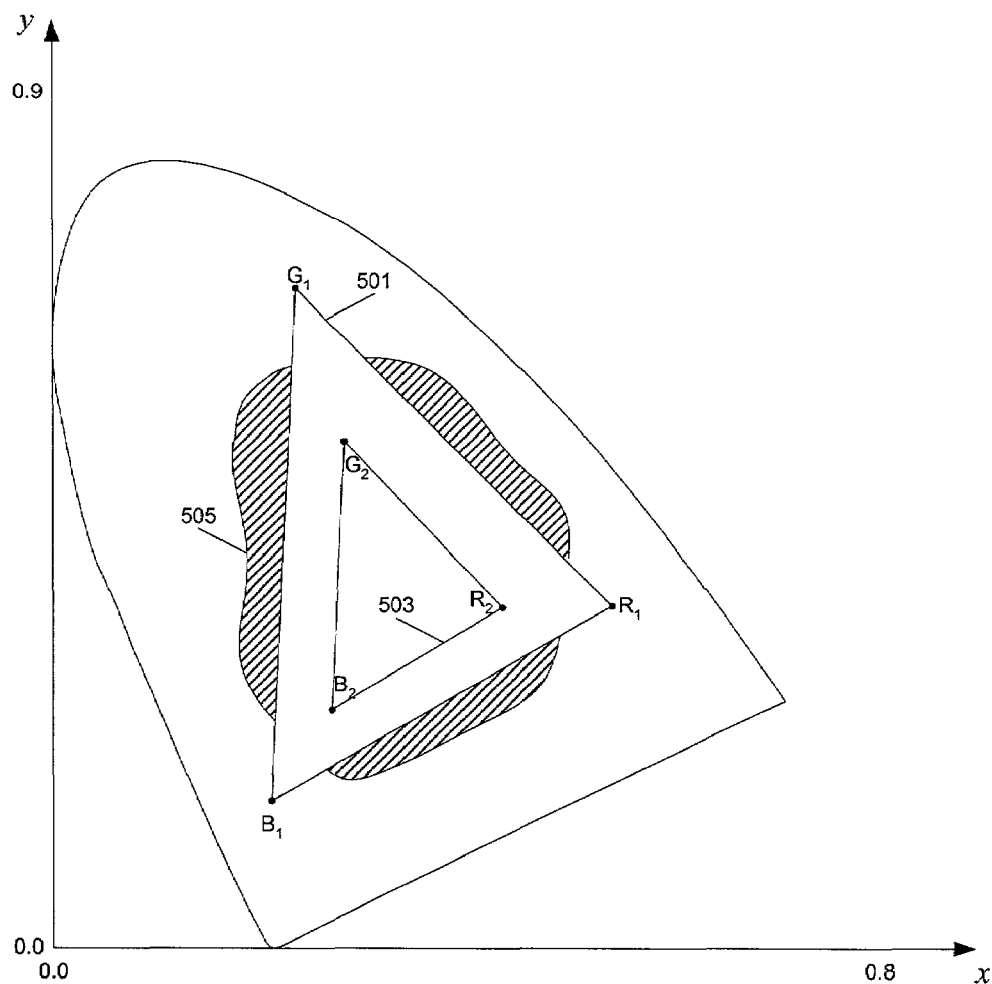
FIG. 5 illustrates a method of using a virtual gamut for a device with a limited gamut according to one embodiment of the present invention.

FIG. 5 illustrates a method of using a virtual gamut for a device with a limited gamut according to one embodiment of the present invention. For a device with a small (limited) gamut 503, a virtual gamut 501 can be used for the device for the purpose of color management. When an image is displayed on a small gamut device, the virtual gamut 501 makes the color manager believe that the image is displayed on a virtual device of a virtual gamut, which is larger than the real (small) gamut of the device. Thus, from the color manager point of view, a device of a large (virtual) gamut 501 is in the place of the real device displaying the image. The color management operations work as if a device of a large gamut 501 is used in the place of the device of small gamut 503. Therefore, when a virtual gamut for a small gamut device is used, the using of the virtual gamut avoids compressing or clipping the gamut of a source image for display on the small gamut device, which leads to better subsequent color reproduction on a large gamut device when the image on the display is used as a reference.

The area of a gamut (e.g., gamut 501 or gamut 503) can be a quality indicator for the gamut. A pleasing image can be generated when the area of a gamut is large. Thus, the area of a gamut can be used to construct a virtual gamut.

Figure 6:
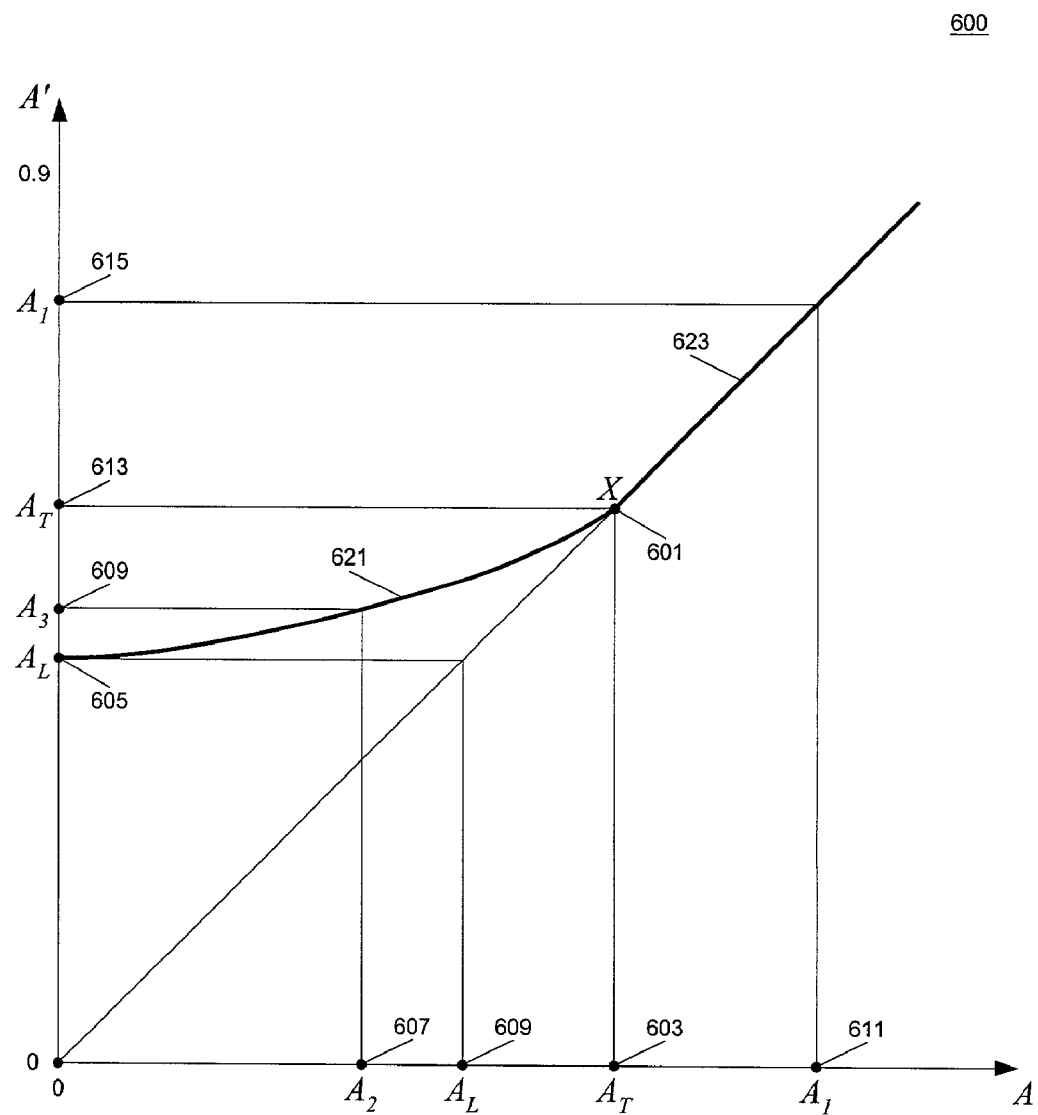
FIG. 6 illustrates a method of generating the area of a virtual gamut for a device with a limited gamut according to one embodiment of the present invention.

FIG. 6 illustrates a method of generating the area of a virtual gamut for a device with a limited gamut according to one embodiment of the present invention. A function of two segments (621 and 623) joining at point X 601 can be used to map an area of a real gamut (A) to a desirable area of a gamut (A'). When the area of the real gamut is larger than a threshold ($A_T$ 603), the desirable area (A') of the gamut of the device is equal to the real area (A) of the real gamut of the device. For example, real area $A_1$ 611 is mapped to desirable area $A_1$ 615 by segment 623. When the area of the real gamut is smaller than the threshold ($A_T$ 603), function 621 maps the real gamut area to a desirable gamut area that is larger than the real gamut area.

In one embodiment of the present invention, the mapping function of segments 621 and 623 is a monotonic continuous function such that a smaller real gamut area (A) is mapped into a smaller desirable gamut area (A') in order to maintain the monotonic color performance of the devices as described earlier. For example, a linear function (or a quadratic function) between points X 601 and $A_L$ 605 can be used for segment 621.

In another embodiment of the present invention, a limit gamut area ($A_L$) is used to specify the minimum acceptable value for a desirable gamut area. Thus, any real gamut area smaller than the threshold area ($A_T$ 603) will be mapped to a desirable gamut area that is larger than the limit gamut area ($A_L$ 605). In one example, the limit gamut area ($A_L$) is the same as the threshold area ($A_T$) such that any real gamut area smaller than the threshold area will be mapped to the threshold area.

In other embodiments of the present invention, various different forms of functions can be used for mapping the real gamut area to the desirable gamut area. For example, the following function can be used for segment 621.

$$A' = A_L + (A_T - A_L) * A/A_T$$

Figure 7:
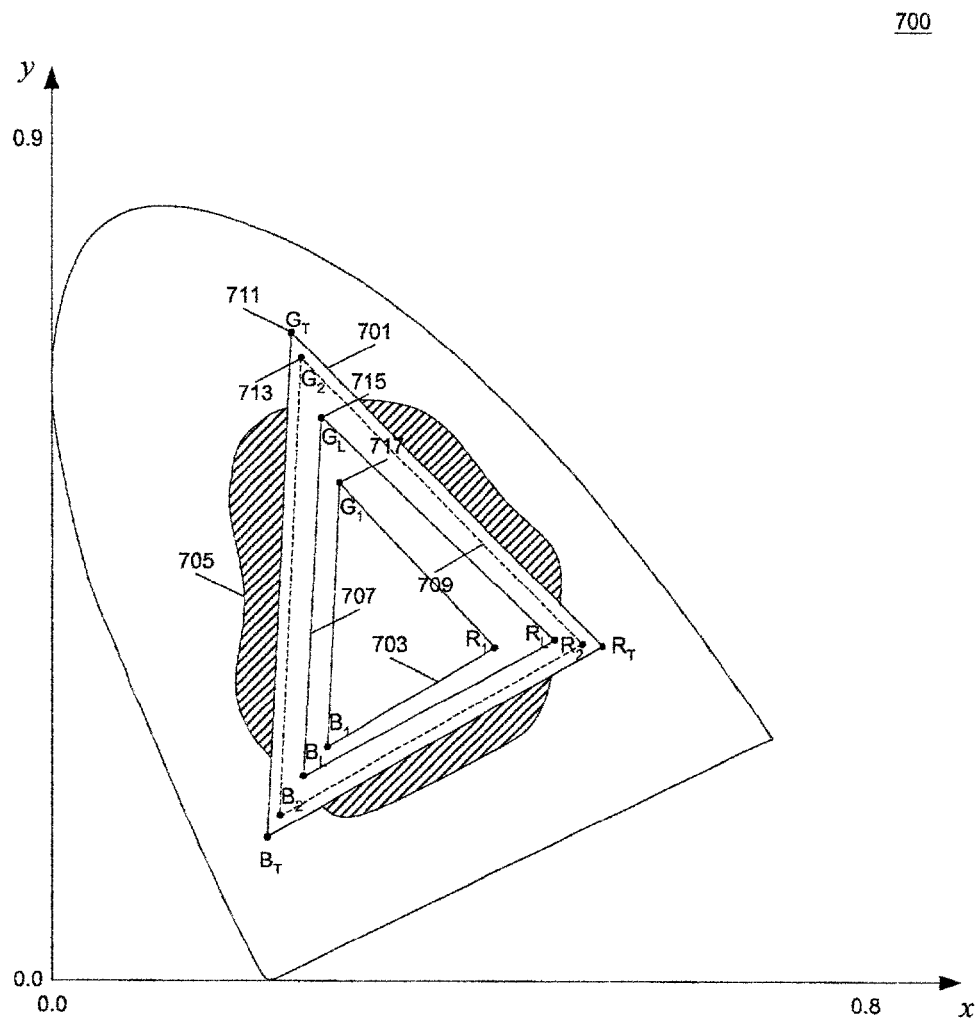
FIG. 7 illustrates an example of generating a virtual gamut in a chromaticity diagram according to one embodiment of the present invention.

FIG. 7 illustrates an example of generating a virtual gamut in a chromaticity diagram according to one embodiment of the present invention. Gamut 705 represents a gamut for a printer. A threshold gamut 701 defines the threshold gamut area ($A_T$); and a limit gamut 707 defines the limit gamut area ($A_L$). A virtual gamut 709 is constructed from an interpolation using the corner points (e.g., the primaries) of the threshold gamut and the limit gamut for gamuts with areas smaller than the threshold area ($A_T$).

In one example, gamut 703 has an area (A) smaller than the threshold gamut area ($A_T$). A virtual gamut 709 is constructed such that the corner points of the virtual gamut is interpolated along the lines connecting the corresponding corner points of the threshold gamut and the limit gamut, as a function of the area of the real gamut 703. For instance, corner point 713 for Green, mapped from point 717, is interpolated along the line on points 711 and 715. When the area (A) of the real gamut 703 is the same as the threshold gamut area, point 713 coincides with point 711; when the area (A) of the real gamut 703 is smaller than the threshold gamut, point 713 moves towards point 715 along the line on points 711 and 715. When the area (A) of the real gamut 703 reaches zero, point 713 reaches point 715. Thus, the similar interpolation scheme as that for computing a desirable gamut area, as illustrated in FIG. 6, can be used to compute the positions of the corner points of the virtual gamut along the lines on the corresponding corner points of the threshold gamut and the limit gamut.

In another example, the threshold gamut coincides with the limit gamut; and all gamuts of an area smaller than that of the threshold gamut have the threshold gamut as their virtual gamut.

Figure 8:
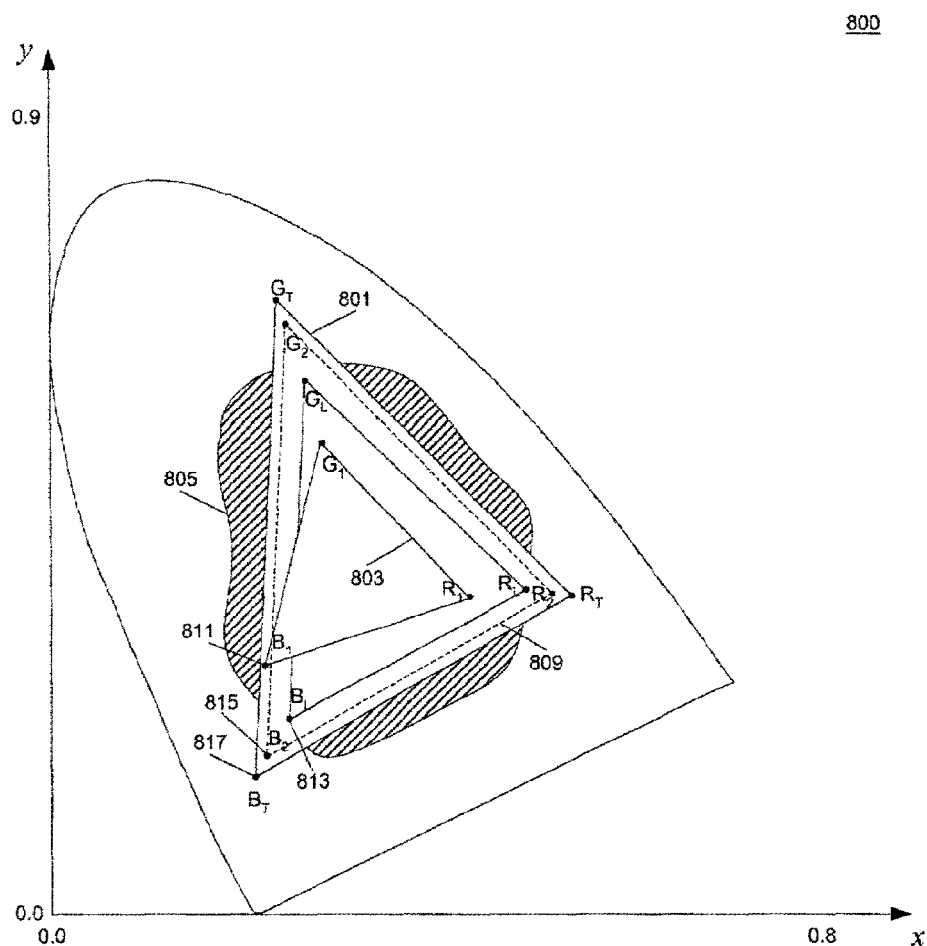
FIG. 8 illustrates another example of generating a virtual gamut in a chromaticity diagram according to one embodiment of the present invention.

FIG. 8 illustrates another example of generating a virtual gamut in a chromaticity diagram according to one embodiment of the present invention. The real gamut 803 of a device is improperly shaped since the corner point 811 for Blue is positioned at a location that is greenish. By mapping the corner point 811 to point 815 of a virtual gamut along the line of points 817 and 813, the influence of the color distortion shown on the display device with gamut 803 on any subsequent color reproduction on devices in the color management workflow will be limited by the virtual gamut.

In one embodiment of the present invention, an interpolation scheme for computing the position of corner point 815 uses also the position of corner point 811 of real gamut 803 to reflect, to a certain degree, the color distortion on the display device. For example, when the coordinates of the points 811, 813, 815 and 817 are denoted as $(x_1, y_1)$, $(X_L, y_L)$, $(x_2, y_2)$ and $(x_T, y_T)$, the corner point for the virtual gamut can be expressed as $$x_2 = x_L + (x_T - x_L) * A/A_T$$

$$y_2 = y_L + (y_T - y_L) * A/A_T$$

From the above description, it will be apparent to one skilled in the art that various interpolation schemes can be used to construct a virtual gamut, including those using the positions of the corner points of the threshold gamut and the limit gamut, as well as the corner points of the real gamut.

Figure 9:
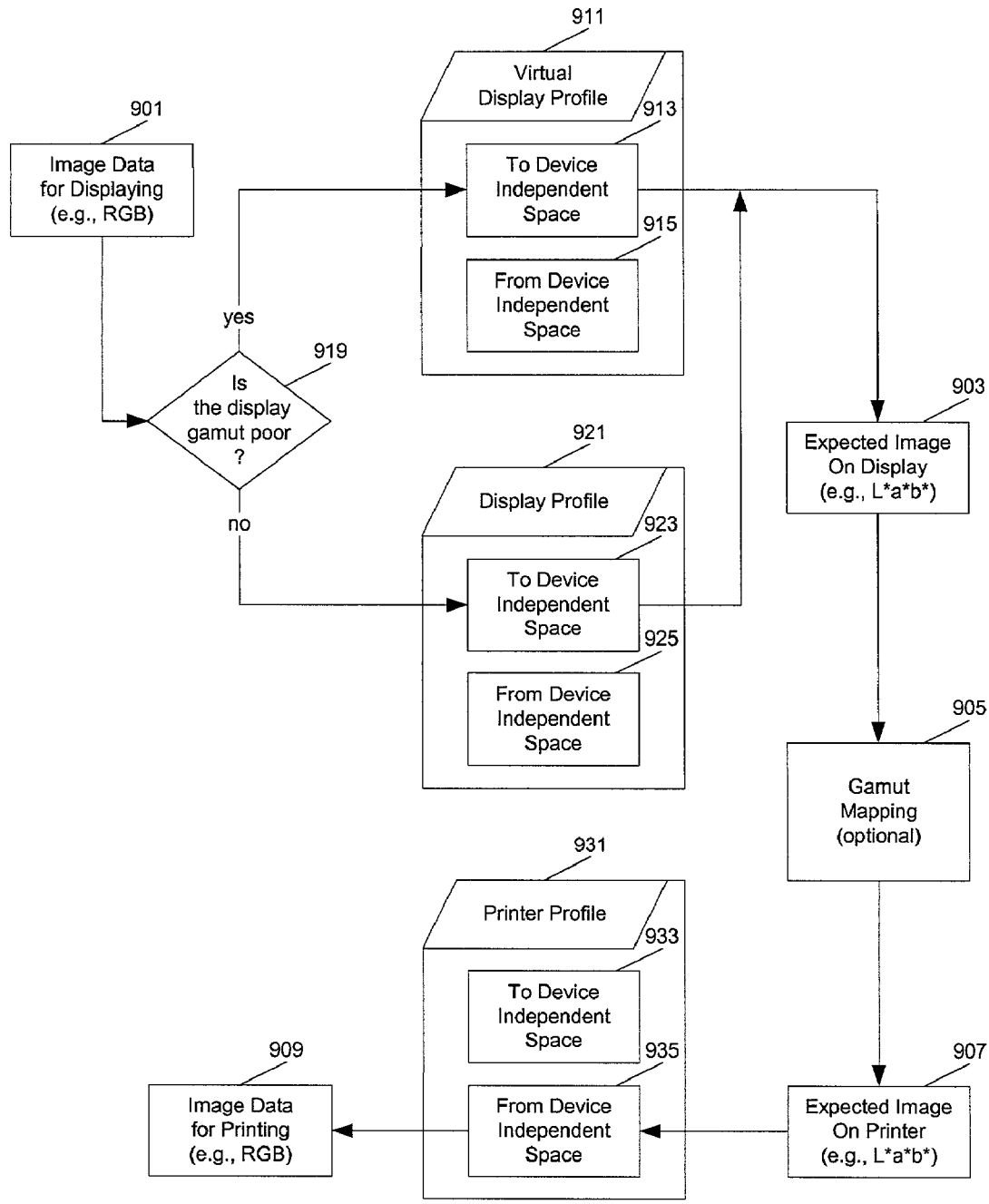
FIG. 9 illustrates an example flow diagram for color matching according to one embodiment of the present invention.

FIG. 9 illustrates an example flow diagram for color matching according to one embodiment of the present invention. A color manager converts image data 901 for driving a display device to image data 909 for driving a printer. If the color manager determines in operation 919 that the real gamut of the display is poor, the color manager uses virtual display profile 911 for converting the image data 901 in a device dependent color space to image data 903 in a device independent color space. The virtual display profile characterizes the virtual gamut of the display device, generated using one of the methods of the present invention. Image data 903 in the device independent color space can then be converted back to image data 909 in a device dependent color space for the printer using the printer profile 931. Optionally, a gamut mapping operation 905 can be performed to convert image data 903 to image data 907 in order to fit the gamut for the printer.

If the color manager determines in operation 919 that the real gamut of the display is not poor, the color manager uses display profile 921 for converting image data 901 in the device dependent color space to image data 903 in the device independent color space. Display profile 921 reflects the characteristics of the real gamut of the display device.

Thus, the transition from using the real gamut to using the virtual gamut of the device is smoothly handled by the color manager without the intervention of the user.

In one embodiment of the present invention, a threshold area is established for all devices in a color managed system. In such an embodiment, the determination of whether or not the real gamut of a device is good does not depend on the gamuts of the other devices in the color management workflow. In a set up process, it can be determined whether or not a device should use a virtual. In such cases virtual profiles for poor gamut devices can be pre-generated to replace the real profiles to eliminate the need for operation 919.

In another embodiment of the present invention, a threshold area is determined from a comparison of the gamuts of the devices in the color management workflow. In such an embodiment, operation 919 is necessary to determine the quality of the devices in the current workflow; and virtual 911 may be generated in response to the determination that the quality of the display gamut is poor.

Although above examples of virtual gamuts are illustrated using display devices in a typical color management workflow where the colors on printers are matched to the colors on display devices, it will be apparent to one skilled in the art from this description that virtual gamuts can also be used for other devices, such as printers, scanners, video cameras, etc. While virtual gamuts can be used for the purpose of color matching between devices in typical color management operations, they can also be used in any other color manipulation operations.

Figure 10:
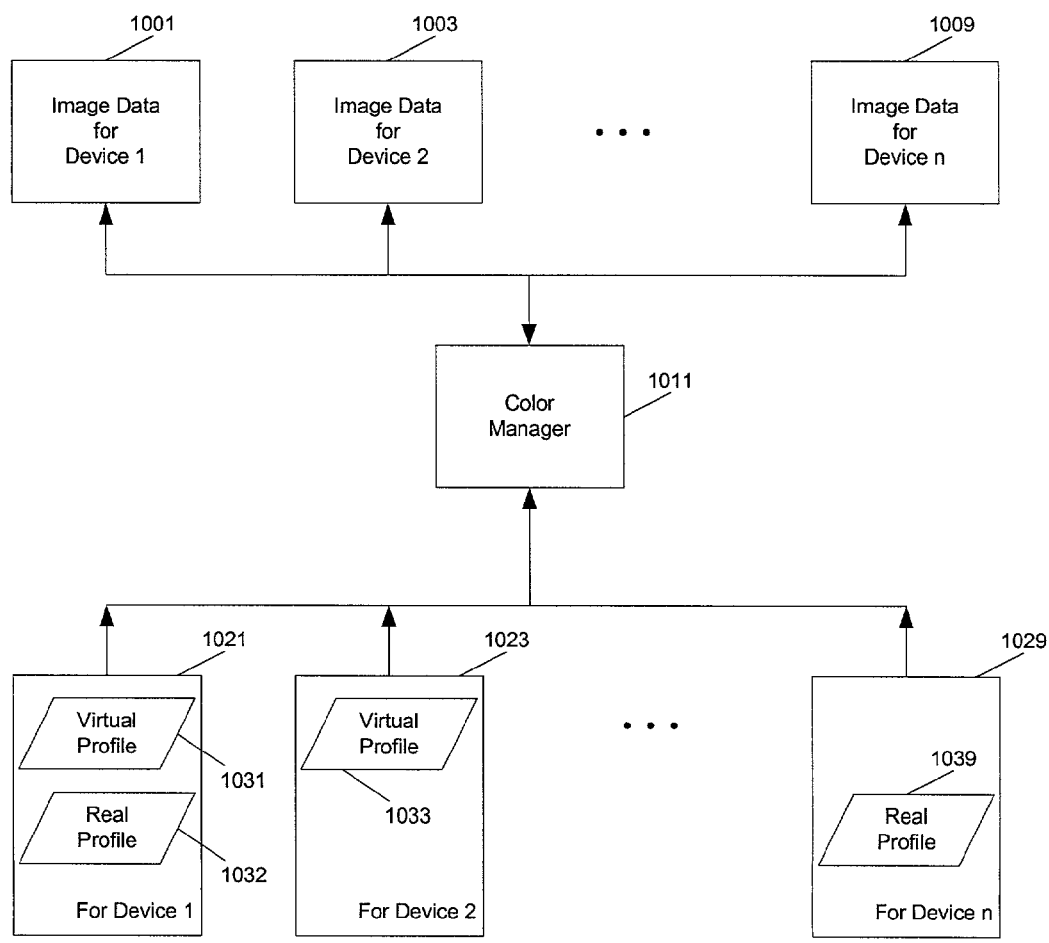
FIG. 10 shows a method for color management according to one embodiment of the present invention.

FIG. 10 shows a method for color management according to one embodiment of the present invention. Color manager 1011 utilized profiles 1021, 1023, . . . , 1029 for various devices in a system in converting image data for these devices (e.g., data 1001, 1003, . . . , 1009). Virtual profiles are generated for the virtual gamuts of the devices; and real profiles are generated for the real gamuts of the devices. For example, virtual profile 1033 for device 2 is the only profile available for device 2. For the purpose of color manager 1011, the device 2 is effectively substituted by a better device with a real gamut that is the same as the virtual gamut, as specified in virtual profile 1033. Real profile 1039 for device n specifies the real gamut of the device, which is a large gamut device. Color manager 1011 use the real profile 1039 to characterize the real images on device n. Real profile 1032 for small gamut device 1 can be used to determine a virtual gamut for device 1. Virtual profile 1031 can be computed at a set up time; or it can be computed at a time when a profile for device 1 is required.

Figure 11:
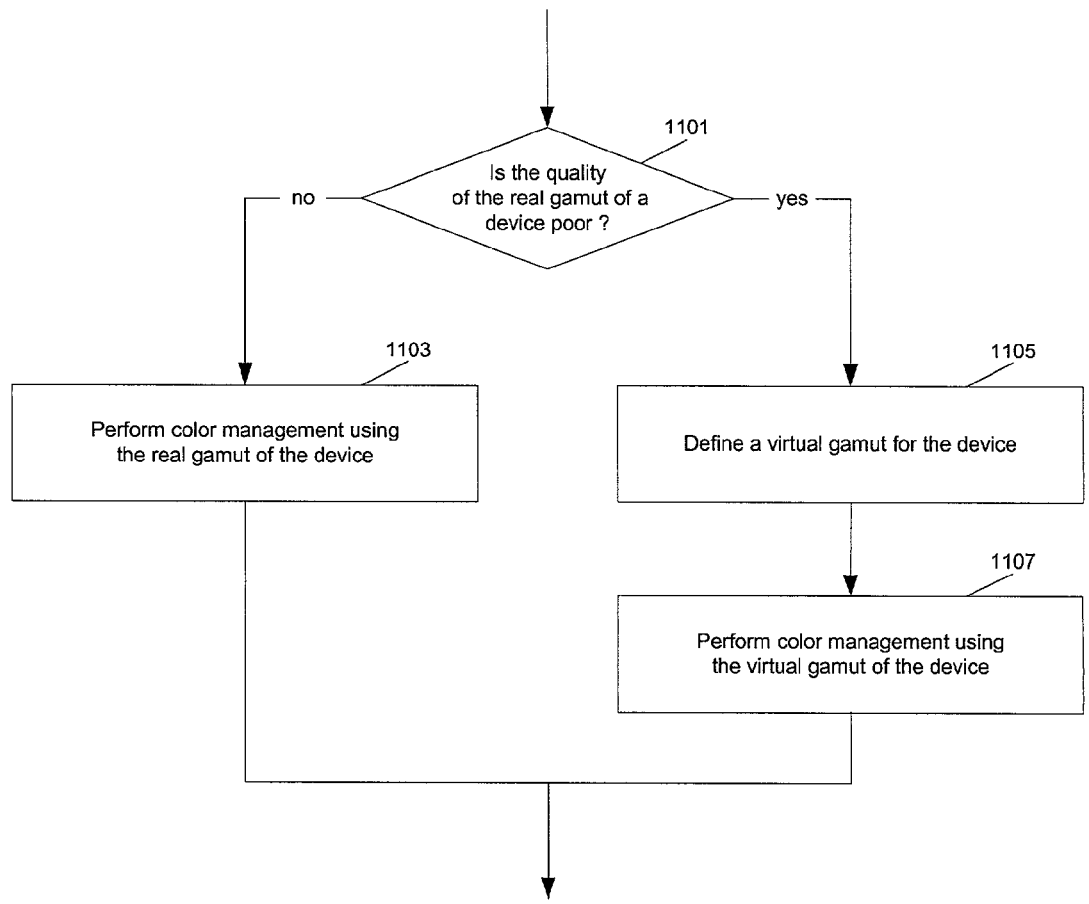
FIG. 11 shows a flow diagram example of color management according to one embodiment of the present invention.

FIG. 11 shows a flow diagram example of color management according to one embodiment of the present invention. Operation 1101 determines whether or not the quality of the real gamut of a device is poor. If the device has a poor gamut, operation 1105 defines a virtual gamut for the device; and operation 1107 performs color management using the virtual gamut of the device. The color management operation may involve various color manipulations, such as converting colors from one color space to another color space (e.g., from a device dependent color space to a device independent color space, from a device independent color space to a device dependent color space, from a device dependent color space to another device dependent color space, or from a device dependent color space for one device to the device dependent color space for another device). If the real gamut of the device is not poor, operation 1103 performs color management using the real gamut of the device.

Figure 12:
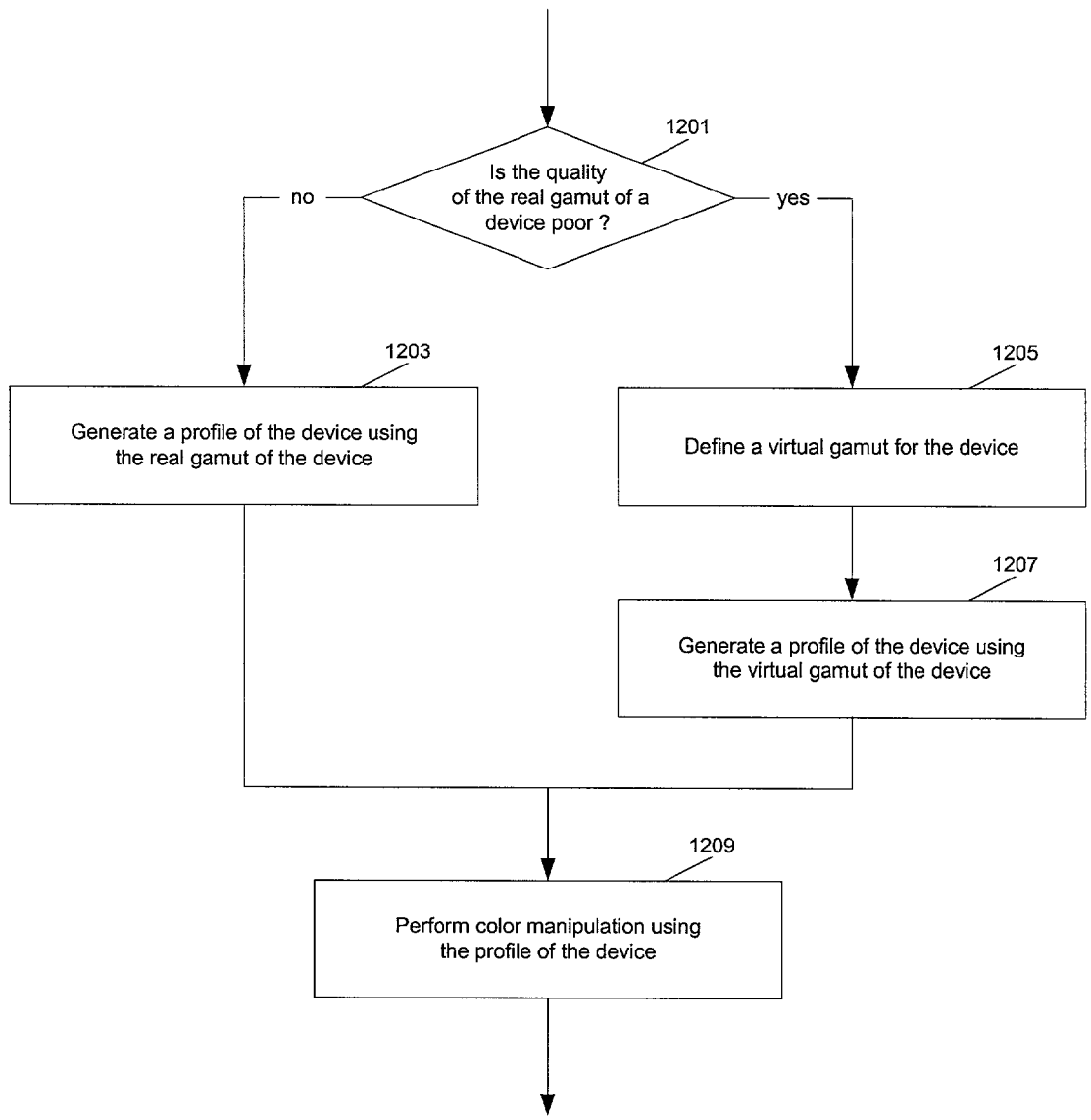
FIG. 12 shows another flow diagram example of color management according to one embodiment of the present invention.

FIG. 12 shows another flow diagram example of color management according to one embodiment of the present invention. Operation 1201 determines whether or not the quality of the real gamut of a device is poor. If the device has a poor gamut, operation 1205 defines a virtual gamut for the device; and operation 1207 generates a profile of the device using the virtual gamut of the device. If the real gamut of the device is not poor, operation 1203 generates a profile of the device using the real gamut of the device. Operation 1029 performs color manipulation using the profile of the device. Typically, a profile of a device contains: 1) a look up table for converting color components represented in a device dependent color space for the device to color components represented in a device independent color space; and 2) an inverse look up table for converting color components represented in the device independent color space back to color components represented in the device dependent color space for the device.

Figure 13:
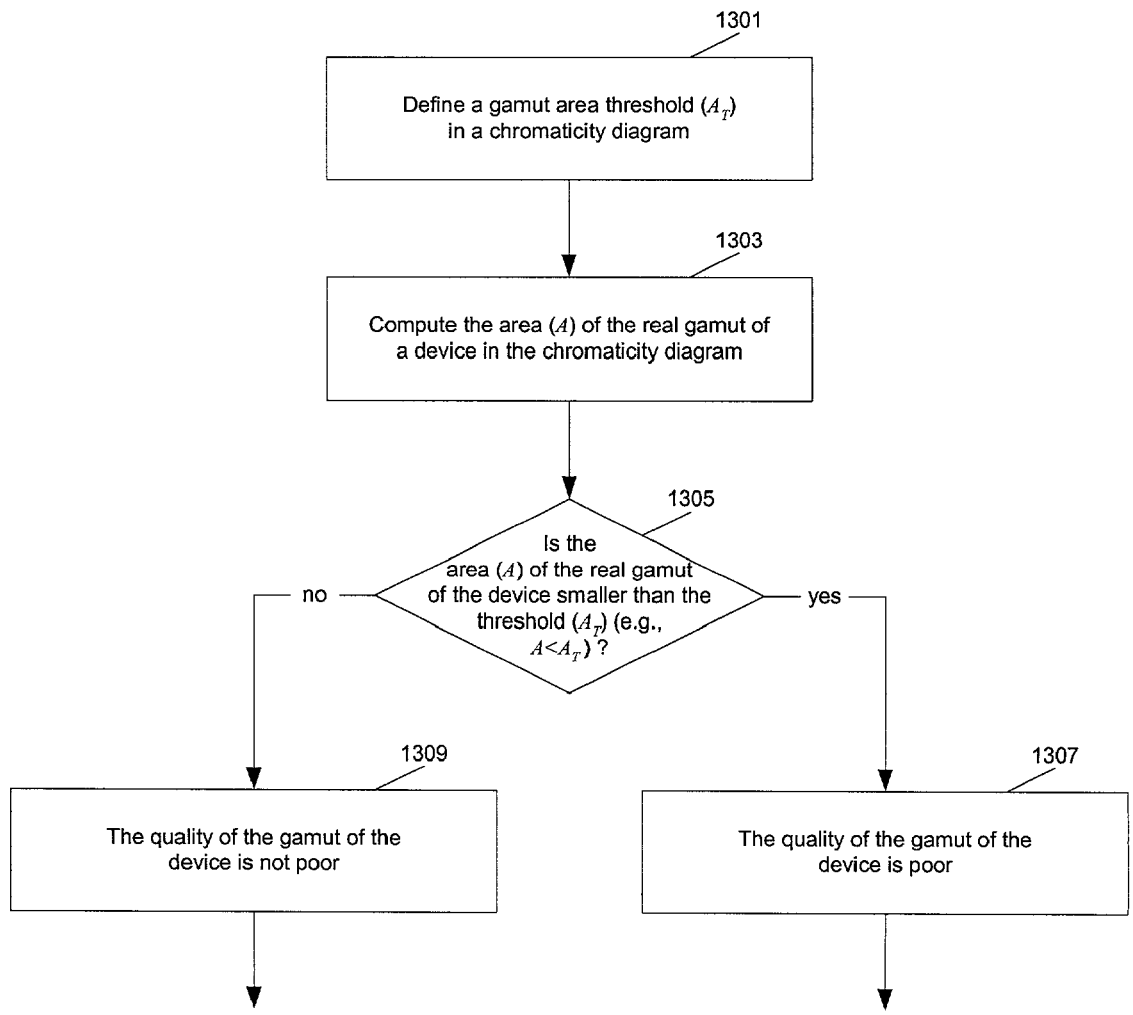
FIG. 13 shows a flow diagram example of determining the quality of the gamut of a device according to one embodiment of the present invention.

FIG. 13 shows a flow diagram example of determining the quality of the gamut of a device according to one embodiment of the present invention. Operation 1301 defines a gamut area threshold ($A_T$) in a chromaticity diagram. Operation 1303 computes the area (A) of the real gamut of a device in the chromaticity diagram. Operation 1305 compares the area (A) of the real gamut to the gamut area threshold ($A_T$). If $A<A_T$, the quality of the gamut of the device is poor; otherwise, the quality of the gamut of the device is not poor. Although the present invention is illustrated using an area in a CIE chromaticity diagram, it will be apparent to one skilled in the art from this description that the same approach can be used in other device independent color space for quantify the size of the gamut of a device. For example, gamut volume in one color space (e.g., a XYZ or L*a*b* color space) can be used, instead of gamut area, as a measure of device reproduction capability. In such a case, the areas of the real, threshold, limit and virtual gamuts can be replaced with the volumes of the real, threshold, limit and virtual gamuts; in FIG. 6, values for gamut area will be replaced by values for gamut volume.

Notice that the area of a gamut can be calculated directly from the coordinates of corner points (the locations of the primaries) of the gamut on the chromaticity diagram. It may also be computed using a proper metric system. For example, in one metric system, if two neighboring points are just noticeably different colors on the chromaticity diagram, the line element connecting the two points has the same constant value along its length. When such a metric system is used, the area can be computed from a weighted area integral on the gamut.

Figure 14:
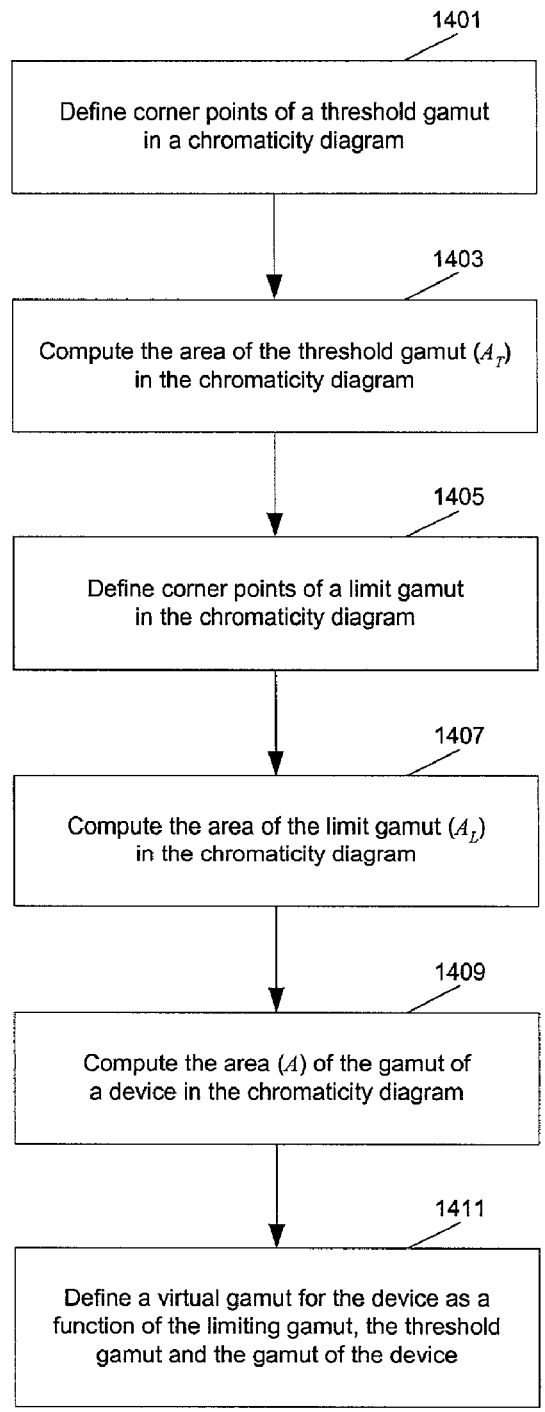
FIG. 14 shows a flow diagram example of generating virtual gamut in a chromaticity diagram according to one embodiment of the present invention.

FIG. 14 shows a flow diagram example of generating virtual gamut in a chromaticity diagram according to one embodiment of the present invention. Operation 1401 defines the corner points of a threshold gamut in a chromaticity diagram; and operation 1403 computes the area of the threshold gamut ($A_T$) in the chromaticity diagram. Operation 1405 defines the corner points of a limit gamut in the chromaticity diagram; and operation 1407 computes the area of the limit gamut ($A_L$) in the chromaticity diagram. Operation 1409 computes the area (A) of the real gamut of a device in the chromaticity diagram. For a poor gamut device (e.g., $A<A_T$), operation 1411 defines a virtual gamut for the device as a function of the limiting gamut, the threshold gamut and the gamut of the device (e.g., from an interpolation of the corner points of the limiting gamut and the threshold gamut as a function of the area (A) of the gamut of the device). In one example, the positions of the corner points of the real gamut are also used in the interpolation. In another example, the positions of the corner points of the real gamut are not used in the interpolation. Various interpolation schemes (e.g., linear, quadratic, or others) can be used.

One embodiment of the present invention replaces, in the color management operations, the real gamut of a display with a virtual gamut, which is larger than the real gamut and larger than a lower limit. The lower limit is imposed such that any virtual gamut will be enough large to ensure a minimum quality in printing when the virtual gamut is used as a source gamut in a color matching process. The virtual gamut is generated such that the characteristics of the real gamut are maintained in order to minimize the color distortion resulting from the operations of matching colors. For example, if possible, a hue constraint can be used to preserve the hue of the primaries of the real gamut in the virtual gamut. A saturation constraint can be used to increase the saturation of the primaries of the virtual gamut from the saturation of the real gamut so that the virtual gamut is larger than the real gamut. Further, a relationship constraint can be used to induce the sensation of the active color management principle, that is, the relationship between colors of two real gamuts is preserved in the virtual gamuts (e.g., a smaller real gamut has a smaller virtual gamut and a larger real gamut has a larger virtual gamut). Furthermore, instead of using the gamut area to decide if a device is poor quality or not, the gamut volume can be used as well. From this description, it will be apparent to one skilled in the art that gamut volume can be calculated in different color spaces, such as XYZ or L*a*b* or other tri-dimensional color spaces.

Figure 22:
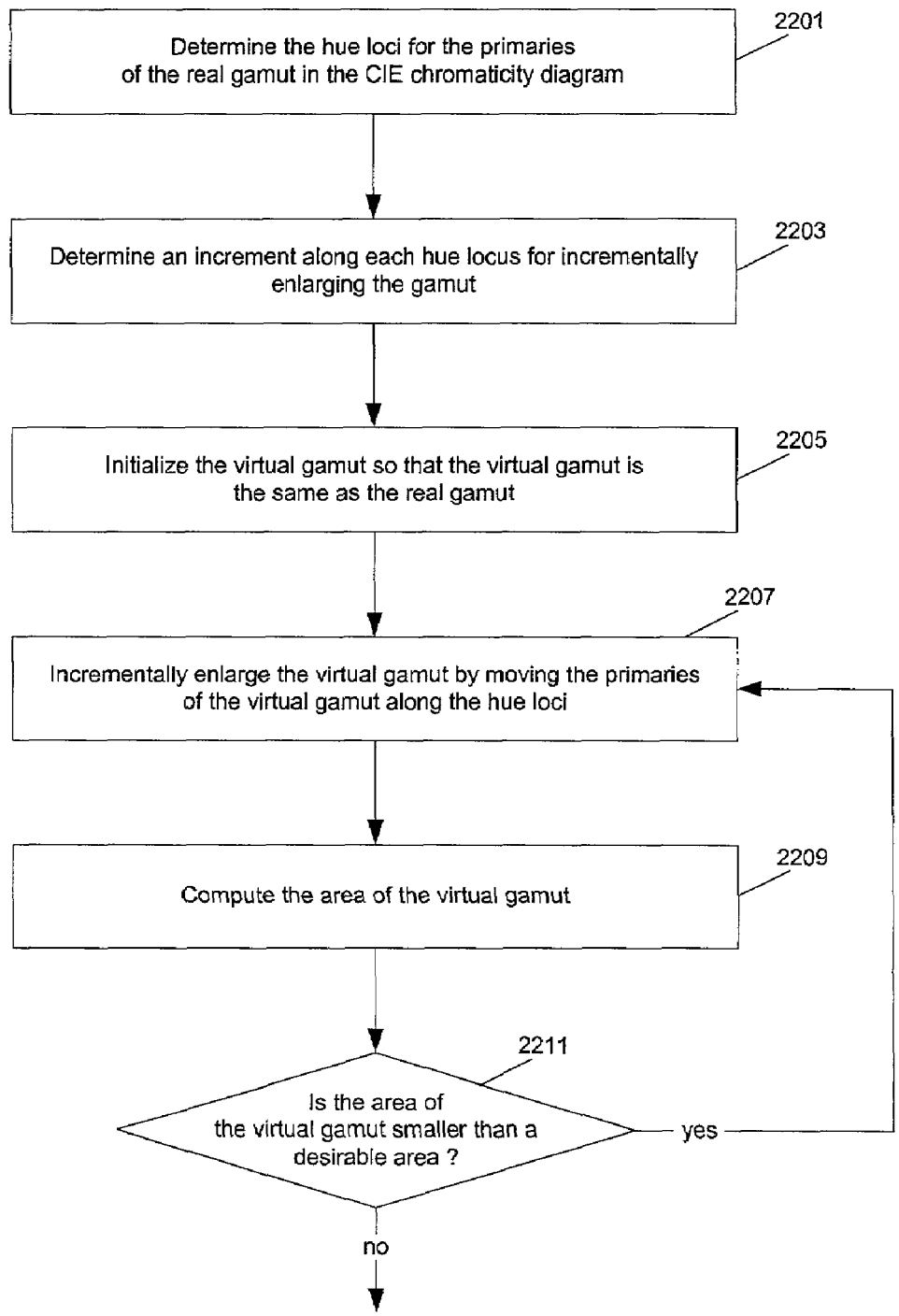
FIG. 22 shows a detailed flow chart for a method to determine a virtual gamut according to one embodiment of the present invention.

FIG. 22 shows a detailed flow chart for a method to determine a virtual gamut according to one embodiment of the present invention. Operation 2201 determines the hue loci (constant hue lines) for the primaries of the real gamut in the CIE chromaticity diagram. Operation 2203 determines an increment along each locus for incrementally enlarging the gamut. Operation 2205 initializes the virtual gamut so that the virtual gamut is the same as the real gamut. Operation 2207 incrementally enlarges the virtual gamut by moving the primaries of the virtual gamut along the hue loci using the increments determined by operation 2203. Operation 2209 computes the area of the virtual gamut in the chromaticity diagram. If operation 2211 determines that the area of the virtual gamut is smaller than a desirable area, operation 2207 further enlarges the virtual gamut by one increment; otherwise, the current virtual gamut is the desirable virtual gamut, which can be used in a color management flow.

Figure 15:
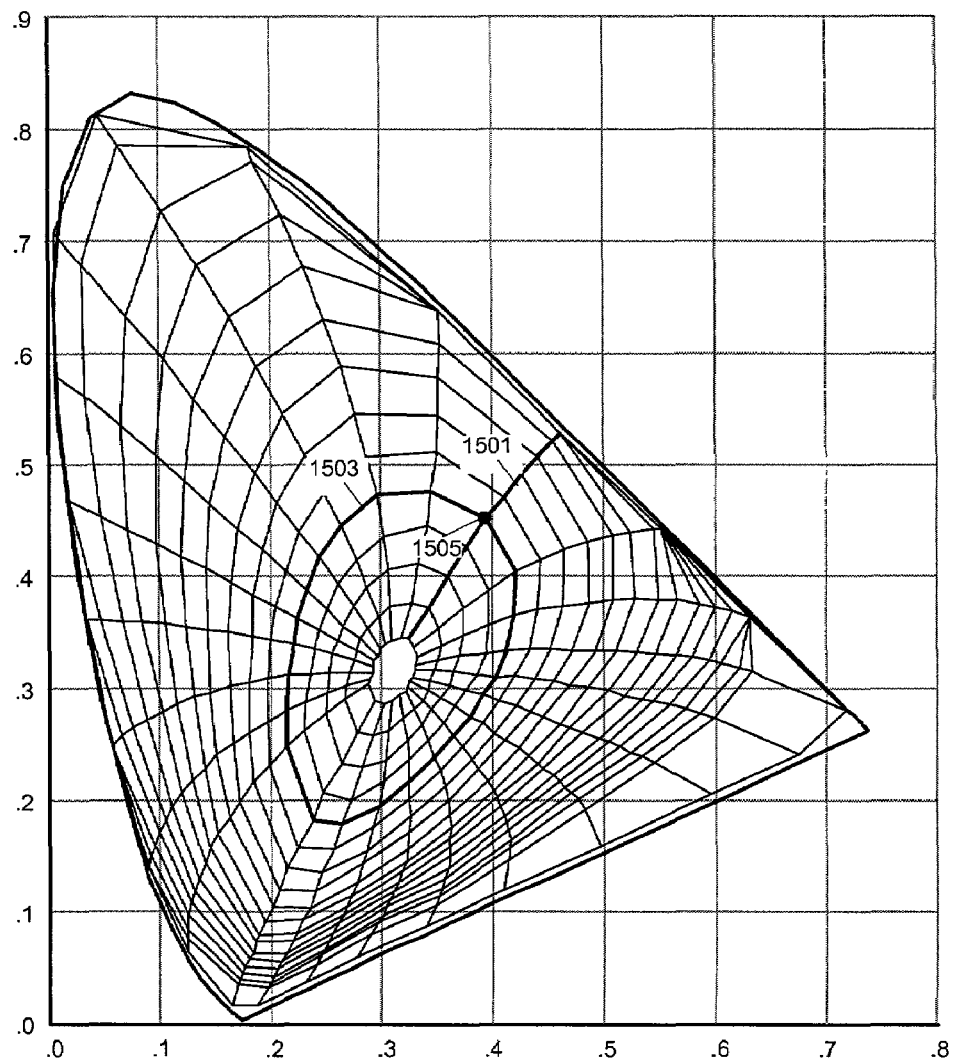
FIG. 15 illustrates constant hue lines and constant saturate lines in a chromaticity diagram which may be used for interpolation according to one embodiment of the present invention.

FIG. 15 illustrates constant hue lines and constant saturate lines in a chromaticity diagram which may be used for interpolation according to one embodiment of the present invention. The constant hue loci in the chromaticity diagram can be determined using the procedure of determining the geodesic curves as described in "Color Science: Concepts and Methods, Quantitative Data and Formulae" by G. Wyszecki and W. S. Stiles. However, it can also be determined from an interpolation scheme. The chromaticity coordinates of each intersection (e.g., point 1505) between the hue lines (e.g., hue line 1501) and the circular saturation lines (e.g., saturation line 1503) are extracted so that an interpolation scheme can be used to determine a hue locus for an arbitrary point in chromaticity diagram.

Figure 16:
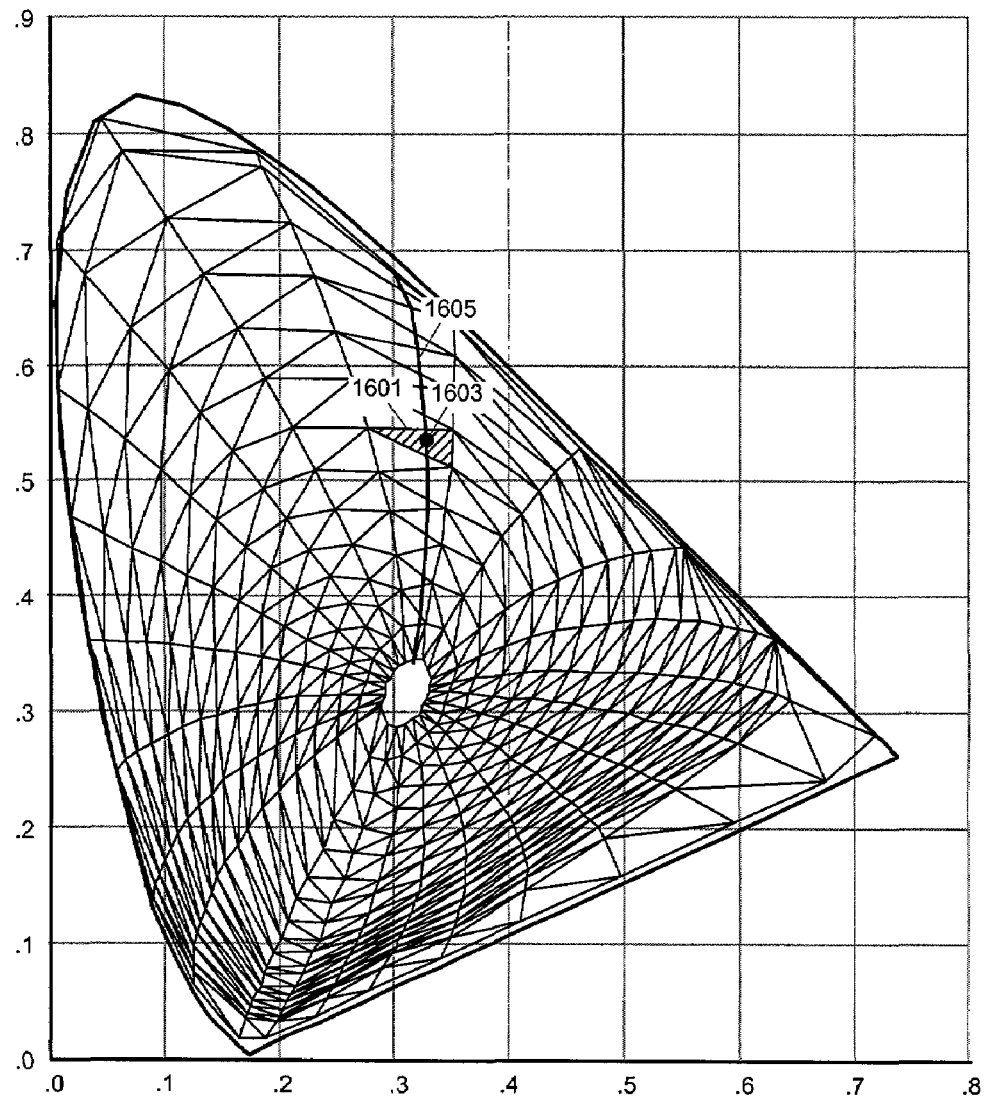
FIG. 16 illustrates an example of partitioning a chromaticity diagram with triangles for generating constant hue lines that are passing primaries of a real gamut according to one embodiment of the present invention.

FIG. 16 illustrates an example of partitioning a chromaticity diagram with triangles for generating constant hue lines that are passing primaries of a real gamut according to one embodiment of the present invention. Based on the intersection points of hue lines and saturation lines, a mesh of triangles can be used to locate a primary of the real gamut. For example, triangle 1601 that contains point 1603, which is a primary of the real gamut, can be identified through a search operation. Then, constant hue line 1605, which passes through primary 1603, can be determined from the mesh of the triangles.

Figure 17:
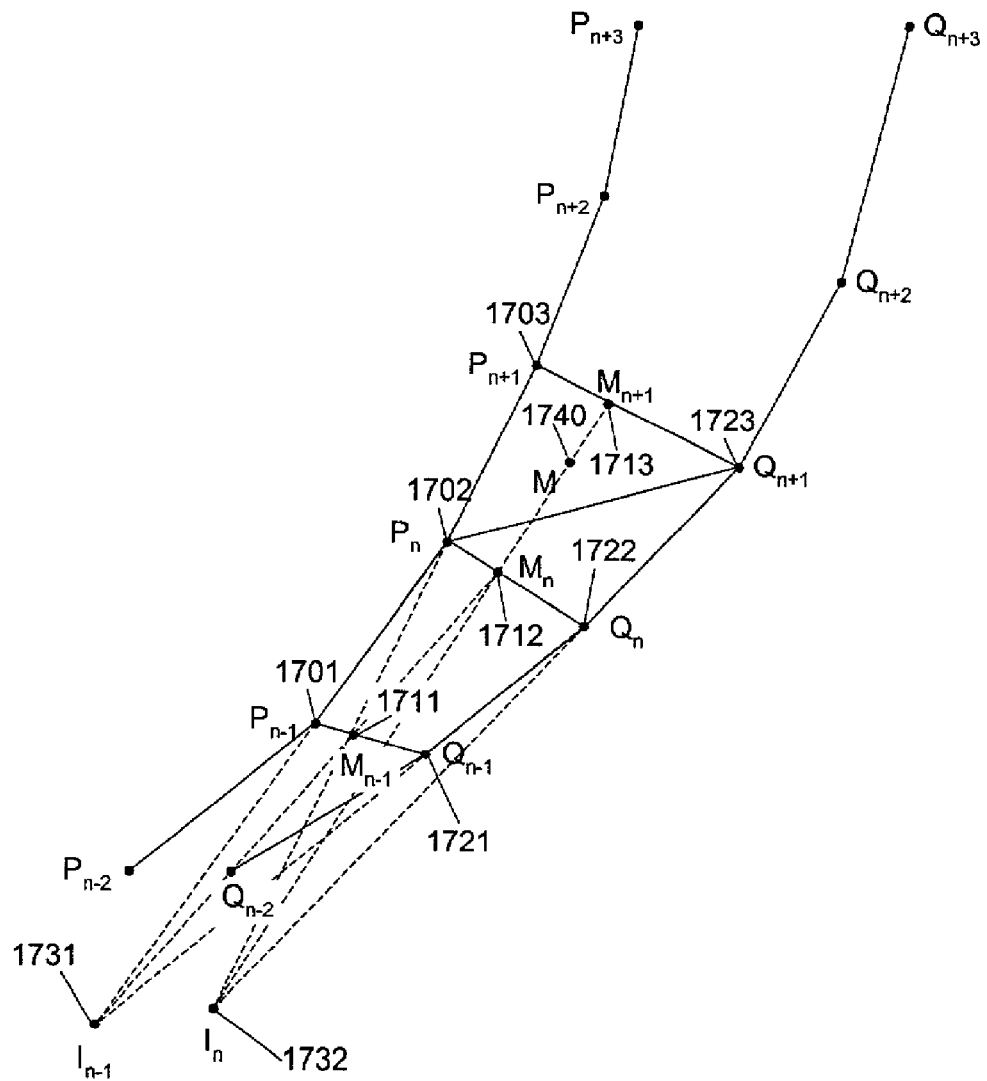
FIGS. 17-18 shows detailed methods for determining an approximation of a constant hue line that is passing through a primary of a real gamut according to one embodiment of the present invention.
Figure 18:
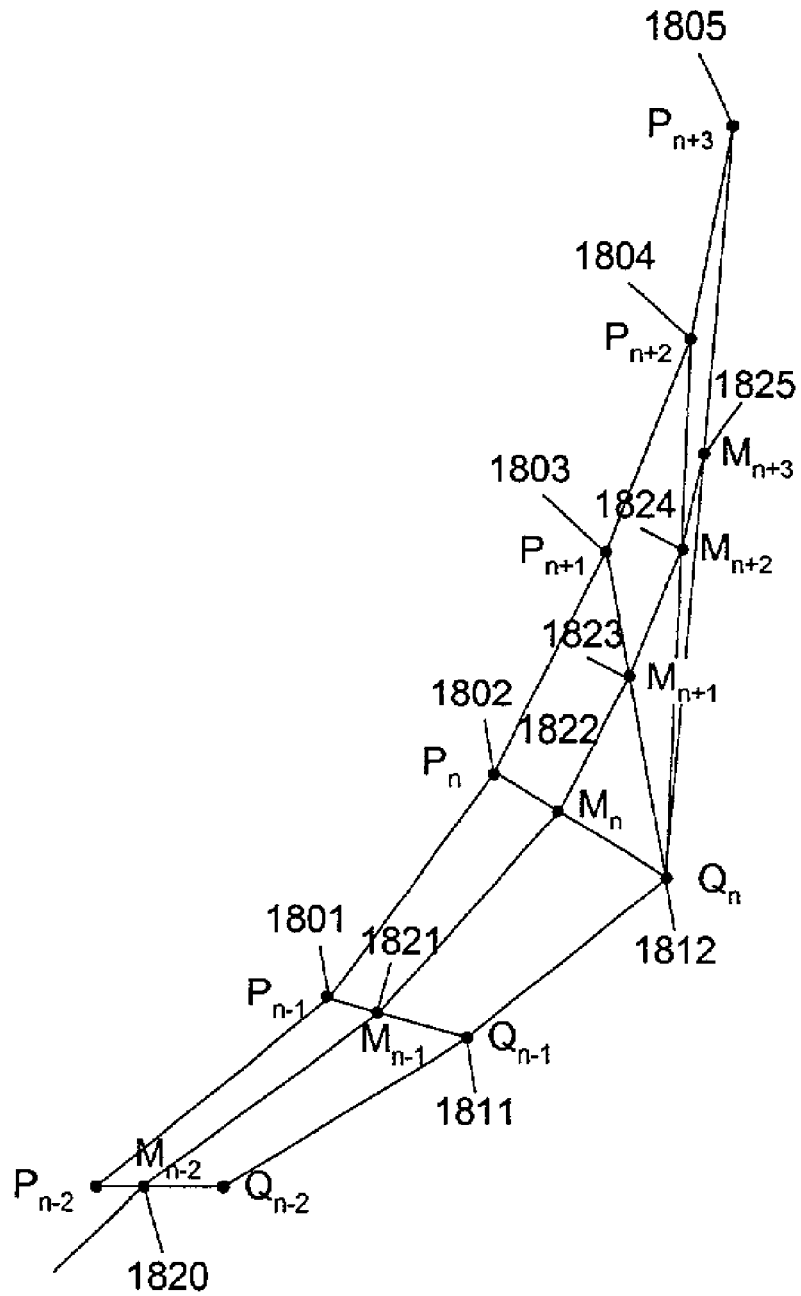

FIGS. 17-18 shows detailed methods for determining an approximation of a constant hue line that is passing through a primary of a real gamut according to one embodiment of the present invention.

In FIG. 17 points $P_{n-1}$ (1701), $P_n$ (1702), $P_{n+1}$ (1703) and $Q_{n-1}$ (1721), $Q_n$ (1722), $Q_{n+1}$ (1723) are intersect points of hue lines and saturation lines. After locating triangle $P_nP_{n+1}Q_{n+1}$, which contains primary M (1740), the mirror triangle $P_nQ_nQ_{n+1}$ can be identified. Polygon $P_nP_{n+1}Q_{n+1}Q_n$ encloses the pair of triangles ($P_nP_{n+1}Q_{n+1}$ and $P_nQ_nQ_{n+1}$). Segments $P_nP_{n+1}$ and $Q_nQ_{n+1}$ intersect at $I_n$(1732). Segment $MI_n$ intersects $P_nQ_n$ and $P_{n+1}Q_{+1}$ at points $M_n$ and $M_{n+1}$ respectively. Segment $M_nM_{n+1}$ represents the constant hue line for the primary M in polygon $P_nP_{n+1}Q_{n+1}Q_n$. When segments $P_nP_{n+1}$ and $Q_nQ_{n+1}$ are parallel to each other, $M_nM_{n+1}$ is also parallel to $P_nP_{n+1}$ and $Q_nQ_{n+1}$. Similarly, $P_{n-1}P_n$ and $Q_{n-1}Q_n$ intersect at $I_{n-1}$ (1731); and segment $I_{n-1}M_n$ determines the position of point $M_{n-1}$ (1711) of segment $M_{n-1}M_n$, which represents the constant hue line in polygon $P_{n-1}P_nQ_nQ_{n-1}$. Thus, segments of the constant hue line for primary M can be determined for decreasing index, as well as for increasing index. Line $M_1 M_2 \ldots M_nM_{n+1} \ldots$ represents an approximation of the constant hue line for primary M.

In FIG. 18, hue line $P_{n-1}P_{n+3}$ (1801 and 1805) contains more intersect points than hue line $Q_{n-1}Q_n$ (1811 and 1812). When the index of the P line ($P_{n-1}P_{n+3}$) goes to a value higher than the highest index of the Q line ($Q_{n-1}Q_n$), the remaining points of the P line are connected to the last point of the Q line. As illustrated in FIG. 18, triangles $P_nP_{n+1}Q_n$, $P_{n+1}P_{n+2}Q_n$ and $P_{n+2}P_{n+3}Q_n$ are used in determining the corresponding segments of the hue locus in these triangles. The hue locus is approximated with segments $M_nM_{n+1}$, $M_{n+1}M_{n+2}$ and $M_{n+2}M_{n+3}$ that are parallel to edges $P_nP_{n+1}$, $P_{n+1}P_{n+2}$ and $P_{n+2}P_{n+3}$ of triangles $P_nP_{n+1}Q_n$, $P_{n+1}P_{n+2}Q_n$ and $P_{n+2}P_{n+3}Q_n$, respectively. Segments $M_{n-2}M_{n-1}$ and $M_{n-1}M_n$ can be determined from polygons $P_{n-2}P_nQ_{n-1}Q_{n-2}$ and $P_{n-1}P_nQ_nQ_{n-1}$ using a method as shown in FIG. 17.

From this description it will be apparent to one skilled in the art that an approximated constant hue line passing through a primary of a real gamut can be determined from a mesh based on the intersect points of hue lines and saturation lines.

Figure 19:
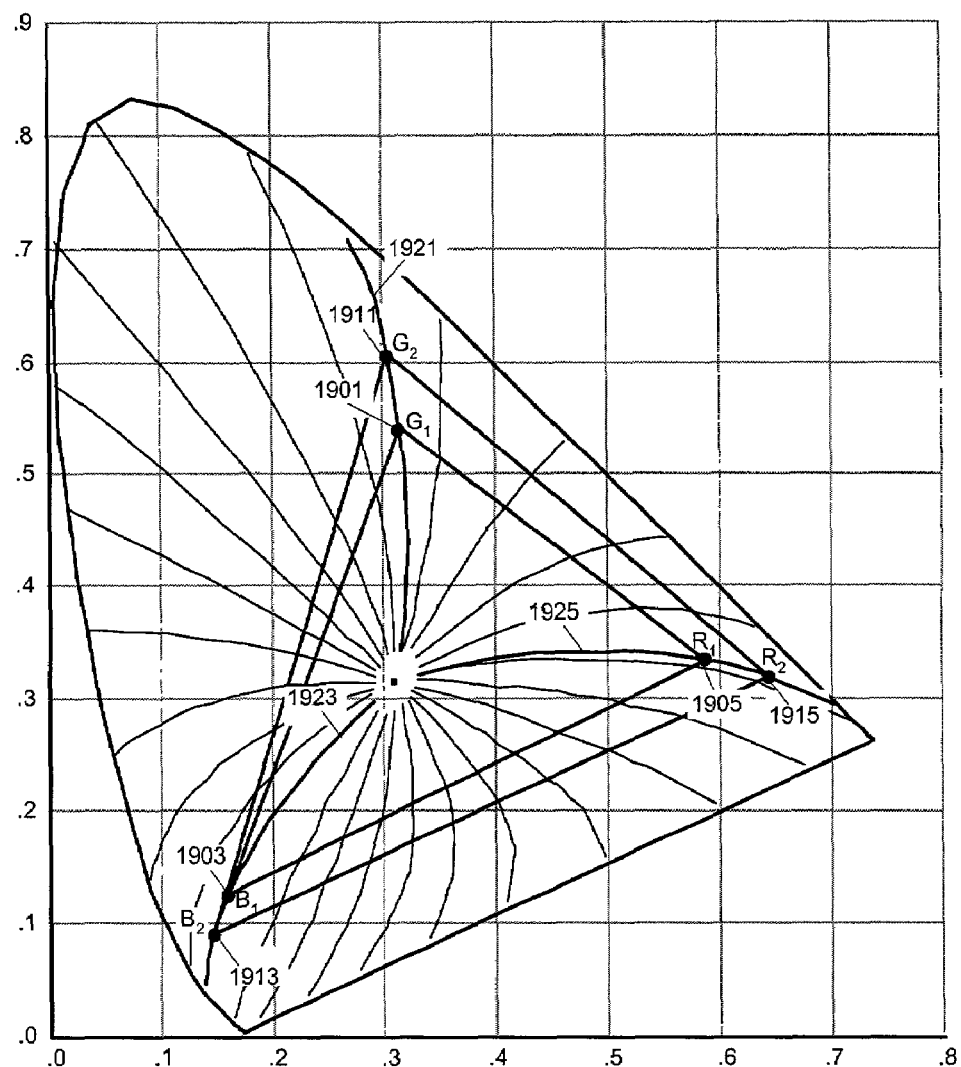
FIG. 19 shows an example of generating a virtual gamut by moving primaries of a real gamut along constant hue lines according to one embodiment of the present invention.

FIG. 19 shows an example of generating a virtual gamut by moving primaries of a real gamut along constant hue lines according to one embodiment of the present invention. After three hue lines (1921, 1923 and 1925) for real gamut $G_1B_1R_1$ (1901, 1903 and 1905) are determined, virtual gamut $G_2B_2R_2$ (1911, 1913 and 1915) can be constructed by stretching the real gamut along these hue lines. By moving the primaries of the gamut along the constant hue loci (1921, 1923 and 1925), the hue constraint is satisfied. The primaries of the real gamut can be shifted into a new position such that the virtual gamut has a desirable area, which is larger than the real gamut and the limit gamut.

Figure 20:
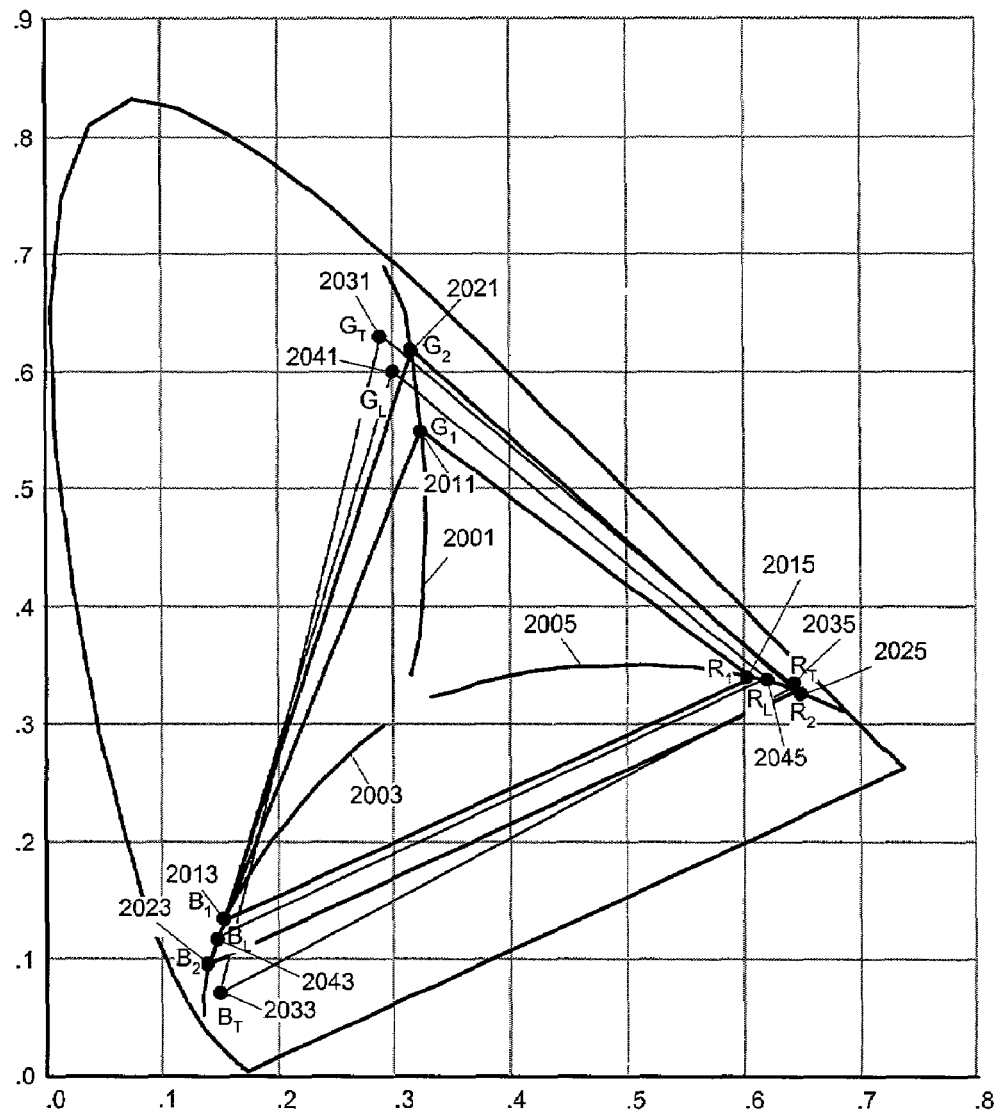
FIG. 20 illustrates a detailed example of generating a virtual gamut according to one embodiment of the present invention.

FIG. 20 illustrates a detailed example of generating a virtual gamut according to one embodiment of the present invention. Threshold gamut $G_TB_TR_T$ (2031, 2033 and 2035) and limit gamut $G_L B_L R_L$ (2041, 2043 and 2045) determine the threshold gamut area ($A_T$) and the limit gamut area ($A_L$). When the real gamut is smaller than the threshold gamut, the desirable virtual gamut area A' for the real gamut $G_1 B_1 R_1$ (2011, 2013 and 2015) with an area A is:

$$A' = A_L + (A_T - A_L) * A / A_T$$

It can be seen that since the area of the real gamut never reaches the value 0, the area of the virtual gamut is always larger than the area of the limit gamut ($A' > A_L$). It also can be seen that area of the virtual gamut is always larger than the area of the real gamut ($A' > A$), since the real gamut is smaller than the threshold gamut. Also, it can be seen that for two real gamuts with $A_1 > A_2$, the relationship between colors in the corresponding virtual gamuts is preserved since $A_1' > A_2'$.

In FIG. 20, primaries of virtual gamut $G_2 B_2 R_2$ (2011, 2013 and 2015) are moved along hue loci 2001, 2003 and 2005 incrementally until the area of the virtual gamut is large than the desirable area A'.

Figure 21:
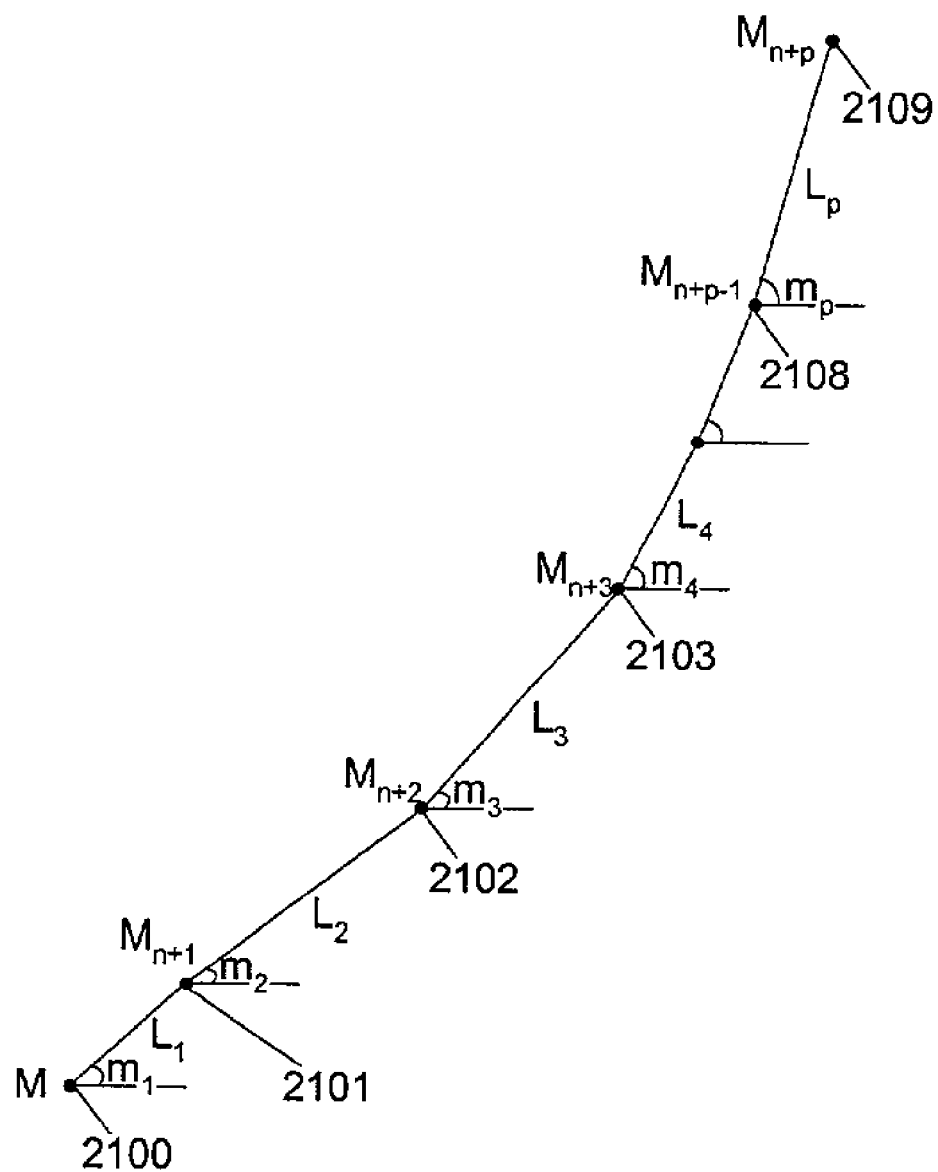
FIG. 21 illustrates a method to determine an increment for moving a primary of a gamut along a constant hue line according to one embodiment of the present invention.

FIG. 21 illustrates a method to determine an increment for moving a primary of a gamut along a constant hue line according to one embodiment of the present invention. Since the CIE chromaticity diagram is not uniform, there is less the room for enlargement in the blue direction as there is in the green direction. However, the process described here is not tight to the CIE chromaticity diagram but can be extended to any color space that allows a specification of the color gamut and the constant hue lines. The above described interpolation procedure and the method of deriving the increment can be equally applied there.

For the CIE chromaticity diagram, the increment for each chromaticity can be found as follows. The length of the hue line $MM_{n+1} + M_{n+2} \ldots M_{n+p}$ can be determined from the lengths of the corresponding segments. $M_{n+p}$ is the last point along the constant hue line passing through primary M. Denoting lengths of segments $MM_{n+1}$, $M_{n+1} M_{n+2}$, ..., and $M_{n+p-1} M_{n+p}$ as $L_1, L_2, \ldots$, and $L_n$ respectively. The total length of hue line $MM_{n+p}$ is:

$$L = L_1 + L_2 + L_3 + \ldots + L_p.$$

Length L is divided into N intervals so that the enlargement procedure is performed within N increments. The increment for each step of enlargement for primary M is $\Delta = L/N$.

Segment $M_{n+1} M_{n+2}$ has length $L_2$. The number of incremental steps for the primary to step through segment $M_{n+1} M_{n+2}$ is approximately $n = L_2/\Delta = N*L_i/L$. In one example, a large N is selected to make A sufficiently small so that a satisfactory precision can be achieve.

When the primary is within segment $M_i M_{i+1}$ and the number of steps for stepping through segment $M_i M_{i+1}$ is $N_i$, the chromaticity coordinates (x, y) of a primary of the current virtual gamut are incremented with the following amount:

$$\delta x_i = [x(M_{i+1}) - x(M_i)]/N_i$$

$$\delta y_i = [y(M_{i+1}) - y(M_i)]/N_i$$

It can be noted that the increments satisfy the condition that $$\delta x_i * \delta x_i + \delta y_i * \delta y_i = \Delta * \Delta.$$

There might be extreme cases where the desirable area A' for the virtual gamut may push the virtual gamut out of the limits of the CIE chromaticity diagram. Limitation on the enlargement operation may be imposed to confine the virtual gamut within the limits of the CIE chromaticity diagram. However, such extreme cases did not occur for real LCD gamuts that have been tested.

In one example, the gamut of an Apple 13" CRT display is chosen as the threshold gamut; and the gamut of a Cinema display is chosen as the limit gamut. Thus, any device with a real gamut smaller than the gamut of the Apple 13" CRT display has a virtual gamut that is larger than the gamut of the Cinema display; any device with a real gamut larger than the gamut of the Apple 13" CRT display does not need a virtual gamut.

The advantages of the methods according to the present inventions include that the full color range of a good device can be fully utilized while the narrow gamut of a poor devices do not present a bottle neck in color quality in the color management workflow.

When the present invention is used in a color management scheme, such as that using the ColorSync architecture, the loss of color quality due to the use of devices with limited color gamut can be limited. Thus, such color management scheme can be safely extended for devices with limited color gamuts, such as hand-held devices. For example, a user can reproduce using a printer a picture displayed on a display device with a large color gamut in a WYSIWYG (What You See Is What You Get) fashion, while getting a better result using the printer for a picture displayed on a limited gamut display device.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method to perform color manipulation on a digital processing system, the method comprising:
   maintaining one or more color profiles for a device having a real gamut, each color profile specifying one gamut for the device;
   determining a virtual gamut for the device from the one or more color profiles maintained, wherein the virtual gamut is substituted for the real gamut for the device if the real gamut is poor in quality; and
   generating color data to control the device using a color profile specifying the virtual gamut, wherein the generation of the color data is independent of the real gamut of the device.

2. A method as in claim 1 further comprising:
   determining whether or not the real gamut of the device is poor in quality.

3. A method as in claim 2 wherein said determining whether or not the real gamut is poor in quality comprises:
   comparing an area of the real gamut with a threshold gamut area in a chromaticity diagram.

4. A method as in claim 1 wherein the color profile is a virtual profile of the device which specifies the virtual gamut of the device; and wherein the generation of color data includes color manipulation comprises color management; and wherein said color management comprises at least one of:
   a) converting a color representation in a device dependent color space to a corresponding color representation in a device independent color space; and
   b) converting a color representation in a device independent color space to a corresponding color representation in another device's dependent color space.

5. A method as in claim 1 further comprising:
   defining the virtual gamut of the device.

6. A method as in claim 5 further comprising:
   generating a virtual profile of the device to specify the virtual gamut.

7. A method as in claim 5 wherein said defining the virtual gamut comprises:
   determining the virtual gamut from an interpolation using the real gamut, threshold gamut and a limit gamut in a chromaticity diagram.

8. A method as in claim 7 wherein the threshold gamut is the same as the limit gamut.

9. A method as in claim 5 wherein said defining the virtual gamut comprises:
   determining an area of the virtual gamut from an area of the real gamut, an area of a threshold gamut and an area of a limit gamut.

10. A method as in claim 9 wherein the area of the virtual gamut increases as the area of the real gamut increases; and wherein the area of the virtual gamut is larger than the area of the real gamut, larger than the area of the limit gamut, and smaller than the area of the threshold gamut.

11. A method as in claim 9 wherein a primary of the virtual gamut and a corresponding primary of the real gamut are on a hue locus; and a saturation of the primary of the virtual gamut is larger than a saturation of the corresponding primary of the real gamut.

12. A method as in claim 7 wherein one of the threshold gamut and the limit gamut is determined from a real gamut of a destination device in the chromaticity diagram.

13. A method to prepare data for performing color manipulation on a digital processing system, the method comprising:
   determining whether or not a real gamut of a device is poor in quality;
   defining a virtual gamut of the device if a real gamut of the device is poor in quality;
   storing a color profile specifying the virtual gamut for the device; and
   generating color data to control the device using the color profile, wherein the generation of the color data is independent of the real gamut of the device, and wherein the virtual gamut substitutes for the poor quality real gamut during subsequent color manipulation.

14. A method as in claim 13 wherein said determining whether or not the real gamut is poor in quality comprises:
   comparing an area of the real gamut with a threshold gamut area in a chromaticity diagram.

15. A method as in claim 13 further comprising:
   generating a virtual profile of the device to specify the virtual gamut.

16. A method as in claim 13 wherein said defining the virtual gamut comprises:
   determining the virtual gamut from an interpolation using the real gamut, a threshold gamut and a limit gamut in a chromaticity diagram.

17. A method as in claim 16 wherein the threshold gamut is the same as the limit gamut.

18. A method as in claim 13 wherein said defining the virtual gamut comprises:
   determining an area of the virtual gamut from an area of the real gamut, an area of a threshold gamut and an area of a limit gamut.

19. A method as in claim 18 wherein the area of the virtual gamut increases as the area of the real gamut increases; and wherein the area of the virtual gamut is larger than the area of the real gamut, larger than the area of the limit gamut, and smaller than the area of the threshold gamut.

20. A method as in claim 18 wherein a primary of the virtual gamut and a corresponding primary of the real gamut are on a hue locus; and a saturation of the primary of the virtual gamut is larger than a saturation of the corresponding primary of the real gamut.

21. A computer readable medium containing profile data of a device for performing color manipulation on a digital processing system, said profile data produced by a method comprising:
   determining whether or not a real gamut of the device is poor in quality;
   computing a virtual gamut of the device from an interpolation using a threshold gamut and a limit gamut in a chromaticity diagram after a determination that the real gamut of the device is poor in quality; and
   storing a color profile specifying the virtual gamut for the device; and
   generating color data to control the device using the color profile, wherein the generation of the color data is independent of the real gamut of the device, and wherein the virtual gamut substitutes for the poor quality real gamut during subsequent color manipulation.

22. A computer readable medium as in claim 21 wherein said determining whether or not the real gamut is poor in quality comprises:
   comparing an area of the real gamut with a threshold gamut area in a chromaticity diagram.

23. A computer readable medium as in claim 21 wherein the threshold gamut is the same as the limit gamut.

24. A computer readable medium as in claim 21 wherein said computing the virtual gamut comprises:
   determining an area of the virtual gamut from an area of the real gamut, an area of a threshold gamut and an area of a limit gamut.

25. A computer readable medium as in claim 24 wherein the area of the virtual gamut increases as the area of the real gamut increases; and wherein the area of the virtual gamut is larger than the area of the real gamut, larger than the area of the limit gamut, and smaller than the area of the threshold gamut.

26. A computer readable medium as in claim 24 wherein a primary of the virtual gamut and a corresponding primary of the real gamut are on a hue locus; and a saturation of the primary of the virtual gamut is larger than a saturation of the corresponding primary of the real gamut.

27. A computer readable medium containing executable computer program instructions which when executed by a digital processing system cause said system to perform a method for color manipulation, the method comprising:
   maintaining one or more color profiles for a device having a real gamut, each color profile specifying one gamut for the device;
   determining a virtual gamut for the device from the one or more color profiles maintained, wherein the virtual gamut is substituted for the real gamut for the device if the real gamut is poor in quality; and
   generating color data to control the device using a color profile specifying the virtual gamut, wherein the generation of the color data is independent of the real gamut of the device.

28. A computer readable medium as in claim 27 wherein the method further comprises:
   determining whether or not the real gamut of the device is poor in quality.

29. A computer readable medium as in claim 28 wherein said determining whether or not the real gamut is poor in quality comprises:
   comparing an area of the real gamut with a threshold gamut area in a chromaticity diagram.

30. A computer readable medium as in claim 27 wherein the color profile is a virtual profile of the device which specifies the virtual gamut of the device; and wherein the generation of color data includes color manipulation comprises color management; and wherein said color management comprises at least one of:
a) converting a color representation in a device dependent color space to a corresponding color representation in a device independent color space; and
b) converting a color representation in a device independent color space to a corresponding color representation in another device's dependent color space.

31. A computer readable medium as in claim 27 wherein the method further comprises:
defining the virtual gamut of the device.

32. A computer readable medium as in claim 31 wherein the method further comprises:
generating a virtual profile of the device to specify the virtual gamut.

33. A computer readable medium as in claim 31 wherein said defining the virtual gamut comprises:
determining the virtual gamut from an interpolation using a threshold gamut and a limit gamut in a chromaticity diagram.

34. A computer readable medium as in claim 33 wherein the threshold gamut is the same as the limit gamut.

35. A computer readable medium as in claim 31 wherein said defining the virtual gamut comprises:
determining an area of the virtual gamut from an area of the real gamut, an area of a threshold gamut and an area of a limit gamut.

36. A computer readable medium as in claim 35 wherein the area of the virtual gamut increases as the area of the real gamut increases; and wherein the area of the virtual gamut is larger than the area of the real gamut, larger than the area of the limit gamut, and smaller than the area of the threshold gamut.

37. A computer readable medium as in claim 35 wherein a primary of the virtual gamut and a corresponding primary of the real gamut are on a hue locus; and a saturation of the primary of the virtual gamut is larger than a saturation of the corresponding primary of the real gamut.

38. A computer readable medium as in claim 33 wherein one of the threshold gamut and the limit gamut is determined from a real gamut of a destination device in the chromaticity diagram.

39. A computer readable medium containing executable computer program instructions which when executed by a digital processing system cause said system to perform a method to prepare data for performing color manipulation, the method comprising:
determining whether or not a real gamut of a device is poor in quality; and
defining a virtual gamut of the device if a real gamut of the device is poor in quality; and
storing a color profile specifying the virtual gamut for the device; and
generating color data to control the device using the color profile, wherein the generation of the color data is independent of the real gamut of the device, and wherein the virtual gamut substitutes for the poor quality real gamut during subsequent color manipulation.

40. A computer readable medium as in claim 39 wherein said determining whether or not the real gamut is poor in quality comprises:
comparing an area of the real gamut with a threshold gamut area in a chromaticity diagram.

41. A computer readable medium as in claim 39 wherein the method further comprises:
generating a virtual profile of the device to specify the virtual gamut.

42. A computer readable medium as in claim 39 wherein said defining the virtual gamut comprises:
determining the virtual gamut from an interpolation using a threshold gamut and a limit gamut in a chromaticity diagram.

43. A computer readable medium as in claim 42 wherein the threshold gamut is the same as the limit gamut.

44. A computer readable medium as in claim 39 wherein said defining the virtual gamut comprises:
determining an area of the virtual gamut from an area of the real gamut, an area of a threshold gamut and an area of a limit gamut.

45. A computer readable medium as in claim 44 wherein the area of the virtual gamut increases as the area of the real gamut increases; and wherein the area of the virtual gamut is larger than the area of the real gamut, larger than the area of the limit gamut, and smaller than the area of the threshold gamut.

46. A computer readable medium as in claim 44 wherein a primary of the virtual gamut and a corresponding primary of the real gamut are on a hue locus; and a saturation of the primary of the virtual gamut is larger than a saturation of the corresponding primary of the real gamut.

47. A digital processing system for color manipulation, the digital processing system comprising:
means for maintaining one or more color profiles for a device having a real gamut, each color profile specifying one gamut for the device;
means for determining a virtual gamut for the device from the one or more color profiles maintained, wherein the virtual gamut is substituted for the real gamut for the device if the real gamut is poor in quality; and
means for generating color data to control the device using a color profile specifying the virtual gamut, wherein the generation of the color data is independent of the real gamut of the device.

48. A digital processing system as in claim 47 further comprising:
means for determining whether or not the real gamut of the device is poor in quality.

49. A digital processing system as in claim 48 wherein said means for determining whether or not the real gamut is poor in quality comprises:
means for comparing an area of the real gamut with a threshold gamut area in a chromaticity diagram.

50. A digital processing system as in claim 47 wherein the color profile is a virtual profile of the device which specifies the virtual gamut of the device; and wherein the generation of color data includes color manipulation comprises color management; and wherein said color management comprises at least one of:
a) converting a color representation in a device dependent color space to a corresponding color representation in a device independent color space; and
b) converting a color representation in a device independent color space to a corresponding color representation in another device's dependent color space.

51. A digital processing system as in claim 47 further comprising:
means for defining the virtual gamut of the device.

52. A digital processing system as in claim 51 further comprising:
means for generating a virtual profile of the device to specify the virtual gamut.

53. A digital processing system as in claim 51 wherein said means for defining the virtual gamut comprises:
- means for determining the virtual gamut from an interpolation using a threshold gamut and a limit gamut in a chromaticity diagram.

54. A digital processing system as in claim 53 wherein the threshold gamut is the same as the limit gamut.

55. A digital processing system as in claim 51 wherein said means for defining the virtual gamut comprises:
- means for determining an area of the virtual gamut from an area of the real gamut, an area of a threshold gamut and an area of a limit gamut.

56. A digital processing system as in claim 55 wherein the area of the virtual gamut increases as the area of the real gamut increases; and wherein the area of the virtual gamut is larger than the area of the real gamut, larger than the area of the limit gamut, and smaller than the area of the threshold gamut.

57. A digital processing system as in claim 55 wherein a primary of the virtual gamut and a corresponding primary of the real gamut are on a hue locus; and a saturation of the primary of the virtual gamut is larger than a saturation of the corresponding primary of the real gamut.

58. A digital processing system as in claim 53 wherein one of the threshold gamut and the limit gamut is determined from a real gamut of a destination device in the chromaticity diagram.

59. A digital processing system method to prepare data for performing color manipulation, the digital processing system comprising:
- means for determining whether or not a real gamut of a device is poor in quality;
- means for defining a virtual gamut of the device if a real gamut of the device is poor in quality; and
- means for storing a color profile specifying the virtual gamut for the device; and
- means for generating color data to control the device using the color profile, wherein the generation of the color data is independent of the real gamut of the device, and wherein the virtual gamut substitutes for the poor quality real gamut during subsequent color manipulation.

60. A digital processing system as in claim 59 wherein said means for determining whether or not the real gamut is poor in quality comprises:
- means for comparing an area of the real gamut with a threshold gamut area in a chromaticity diagram.

61. A digital processing system as in claim 59 further comprising:
- means for generating a virtual profile of the device to specify the virtual gamut.

62. A digital processing system as in claim 59 wherein said means for defining the virtual gamut comprises:
- means for determining the virtual gamut from an interpolation using a threshold gamut and a limit gamut in a chromaticity diagram.

63. A digital processing system as in claim 62 wherein the threshold gamut is the same as the limit gamut.

64. A digital processing system as in claim 59 wherein said means for defining the virtual gamut comprises:
- means for determining an area of the virtual gamut from an area of the real gamut, an area of a threshold gamut and an area of a limit gamut.

65. A digital processing system as in claim 64 wherein the area of the virtual gamut increases as the area of the real gamut increases; and wherein the area of the virtual gamut is larger than the area of the real gamut, larger than the area of the limit gamut, and smaller than the area of the threshold gamut.

66. A digital processing system as in claim 64 wherein a primary of the virtual gamut and a corresponding primary of the real gamut are on a hue locus; and a saturation of the primary of the virtual gamut is larger than a saturation of the corresponding primary of the real gamut.

* * * * *

UNITED STATES PATENT AND TRADEMARK OFFICE
CERTIFICATE OF CORRECTION

PATENT NO. : 7,609,413 B1
APPLICATION NO. : 10/138363
DATED : October 27, 2009
INVENTOR(S) : Marcu et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1455 days.

Signed and Sealed this

Twelfth Day of October, 2010

David J. Kappos
*Director of the United States Patent and Trademark Office*